US010466945B2

(12) United States Patent
Minami

(10) Patent No.: US 10,466,945 B2
(45) Date of Patent: Nov. 5, 2019

(54) INFORMATION PROCESSING APPARATUS CONFIGURED TO NOTIFY A COMMUNICATION TERMINAL OF CONNECTION INFORMATION USED TO ESTABLISH A NETWORK CONNECTION BETWEEN AN INFORMATION PROCESSING APPARATUS AND THE COMMUNICATION TERMINAL, COMMUNICATION SYSTEM, AND COMMUNICATION METHOD CONFIGURED TO PERFORM SAME

(71) Applicant: Kohichiroh Minami, Kanagawa (JP)

(72) Inventor: Kohichiroh Minami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/993,789

(22) Filed: May 31, 2018

(65) Prior Publication Data

US 2018/0357021 A1    Dec. 13, 2018

(30) Foreign Application Priority Data

Jun. 7, 2017    (JP) .................................. 2017-112256

(51) Int. Cl.
  *G06F 3/12*  (2006.01)
  *H04W 4/80*  (2018.01)
  (Continued)

(52) U.S. Cl.
  CPC ............ *G06F 3/128* (2013.01); *G06F 3/1204* (2013.01); *G06F 3/1236* (2013.01);
  (Continued)

(58) Field of Classification Search
  None
  See application file for complete search history.

(56) References Cited

U.S. PATENT DOCUMENTS 9,317,233 B2 * 4/2016 Asai ...................... G06F 3/1236
2013/0229685 A1    9/2013 Naruse
(Continued)

FOREIGN PATENT DOCUMENTS

CN    105939430 A    9/2016
CN    108067928 A    11/2016
(Continued)

OTHER PUBLICATIONS

U.S. Appl. No. 15/917,894, filed Mar. 12, 2018 Kohichiroh Minami, et al.

(Continued)

*Primary Examiner* — Thomas D Lee
(74) *Attorney, Agent, or Firm* — Harness, Dickey & Pierce, P.L.C.

(57) ABSTRACT

An information processing apparatus includes circuitry to transmit network identification information of a network to a communication terminal via short-range wireless communication and acquire, from the communication terminal via short-range wireless communication, address information indicating an address on the Internet accessible by the communication terminal based on the network identification information. The circuitry notifies a plurality of pieces of connection information of the communication terminal using the address information acquired from the communication terminal, the connection information to be used for establishing a connection between the information processing apparatus and the communication terminal through the network.

11 Claims, 18 Drawing Sheets

(51) Int. Cl.
*H04L 29/08* (2006.01)
*H04W 84/18* (2009.01)
*H04W 8/00* (2009.01)

(52) U.S. Cl.
CPC .......... *G06F 3/1292* (2013.01); *H04L 67/141* (2013.01); *H04L 67/26* (2013.01); *H04W 84/18* (2013.01); *H04L 67/02* (2013.01); *H04W 4/80* (2018.02); *H04W 8/005* (2013.01)

(56) References Cited

U.S. PATENT DOCUMENTS

| | | |
|---|---|---|
| 2015/0212769 A1 | 7/2015 | Norota et al. |
| 2016/0165385 A1 | 6/2016 | Fujisawa |
| 2016/0255218 A1 | 9/2016 | Takahashi |
| 2016/0261769 A1 | 9/2016 | Yamada |
| 2016/0316088 A1 | 10/2016 | Negoro |
| 2017/0099570 A1 | 4/2017 | Yamada |
| 2017/0102903 A1* | 4/2017 | Nagasawa ............. G06F 3/1222 |
| 2018/0020120 A1 | 1/2018 | Yamada |
| 2018/0285035 A1* | 10/2018 | Asakura ................ G06F 3/1208 |
| 2018/0352407 A1 | 12/2018 | Yamada |

FOREIGN PATENT DOCUMENTS

| | | |
|---|---|---|
| CN | 106415508 A | 2/2017 |
| EP | 3065436 A1 | 9/2016 |
| JP | 2002-132477 | 5/2002 |
| JP | 2015-159533 | 9/2015 |
| JP | 2016-164776 | 9/2016 |
| JP | 2016-178462 | 10/2016 |

OTHER PUBLICATIONS

European Search Report dated Nov. 2, 2018 in corresponding Application No. 18175047.2.
Communication dated Jun. 27, 2019 by the Chinese Patent Office for Chinese Patent Application No. 201810550332.5.

* cited by examiner

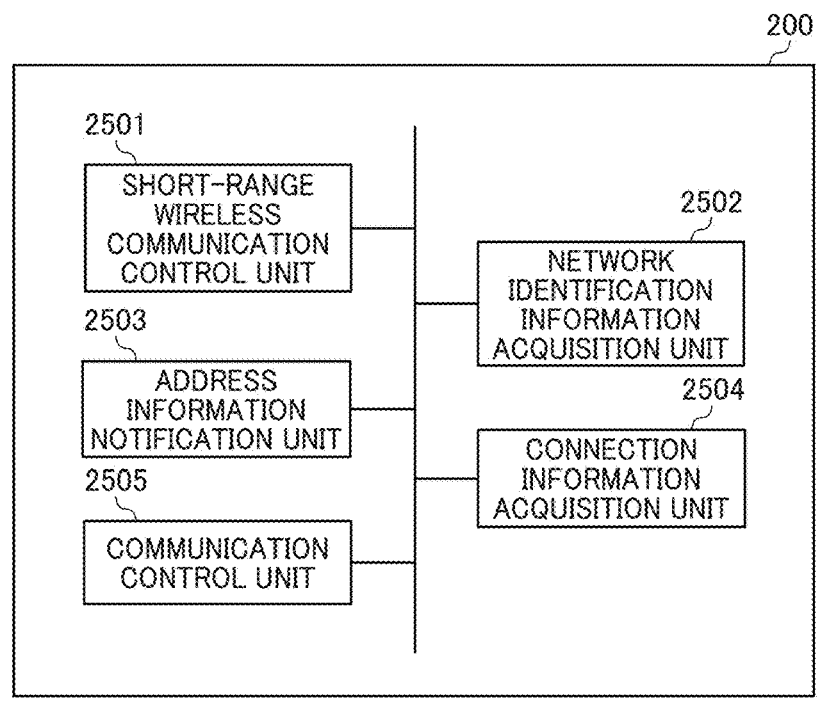

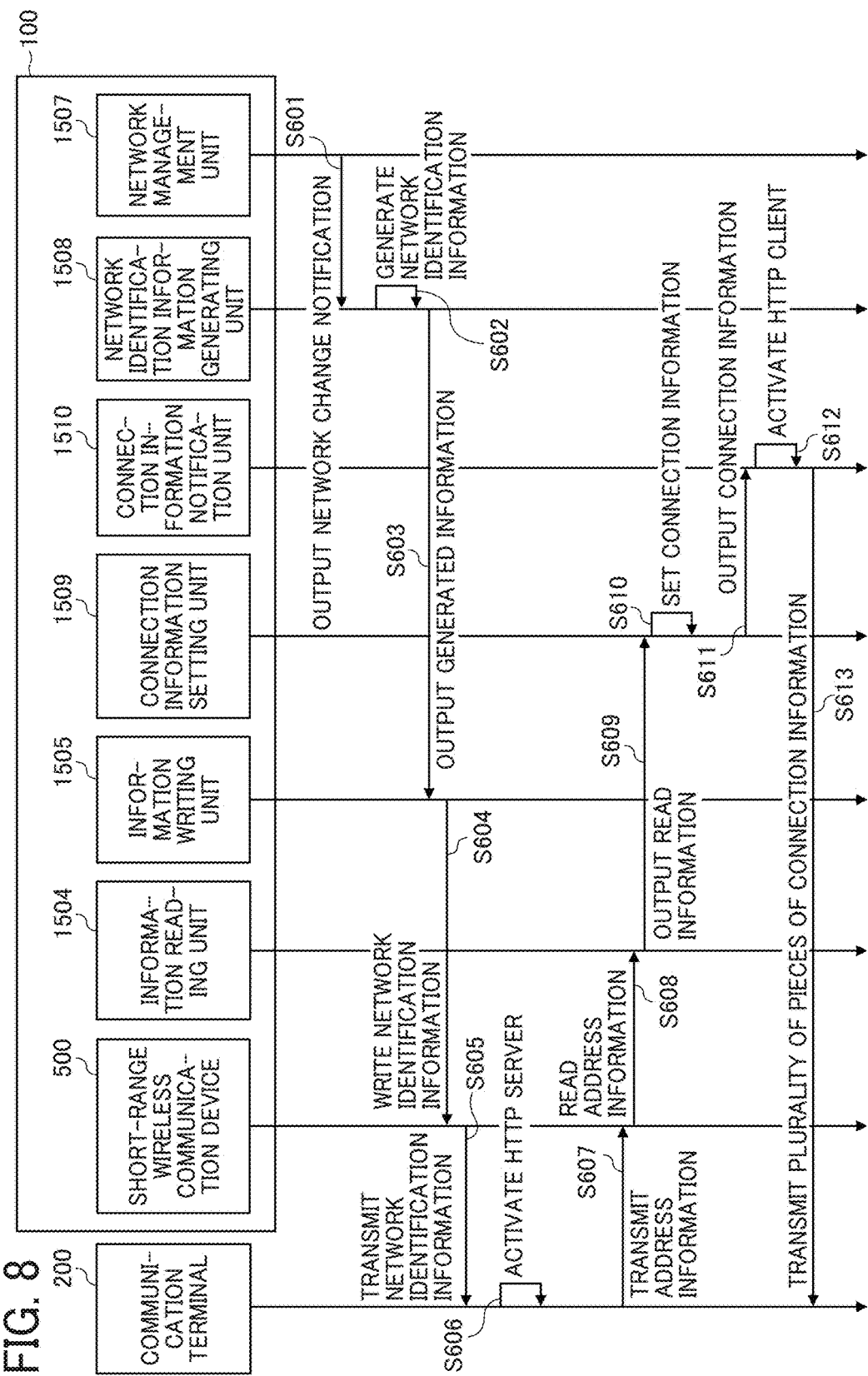

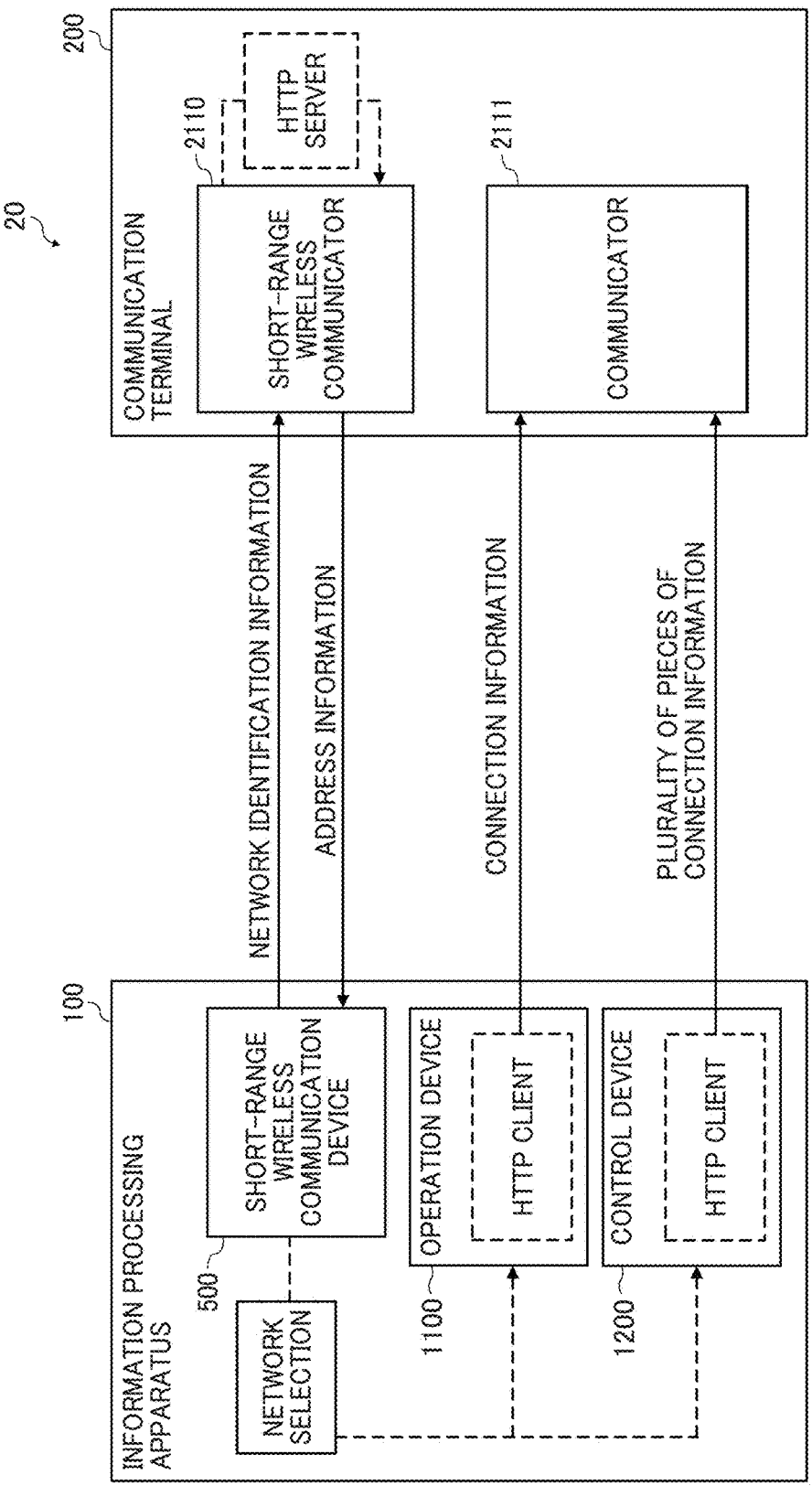

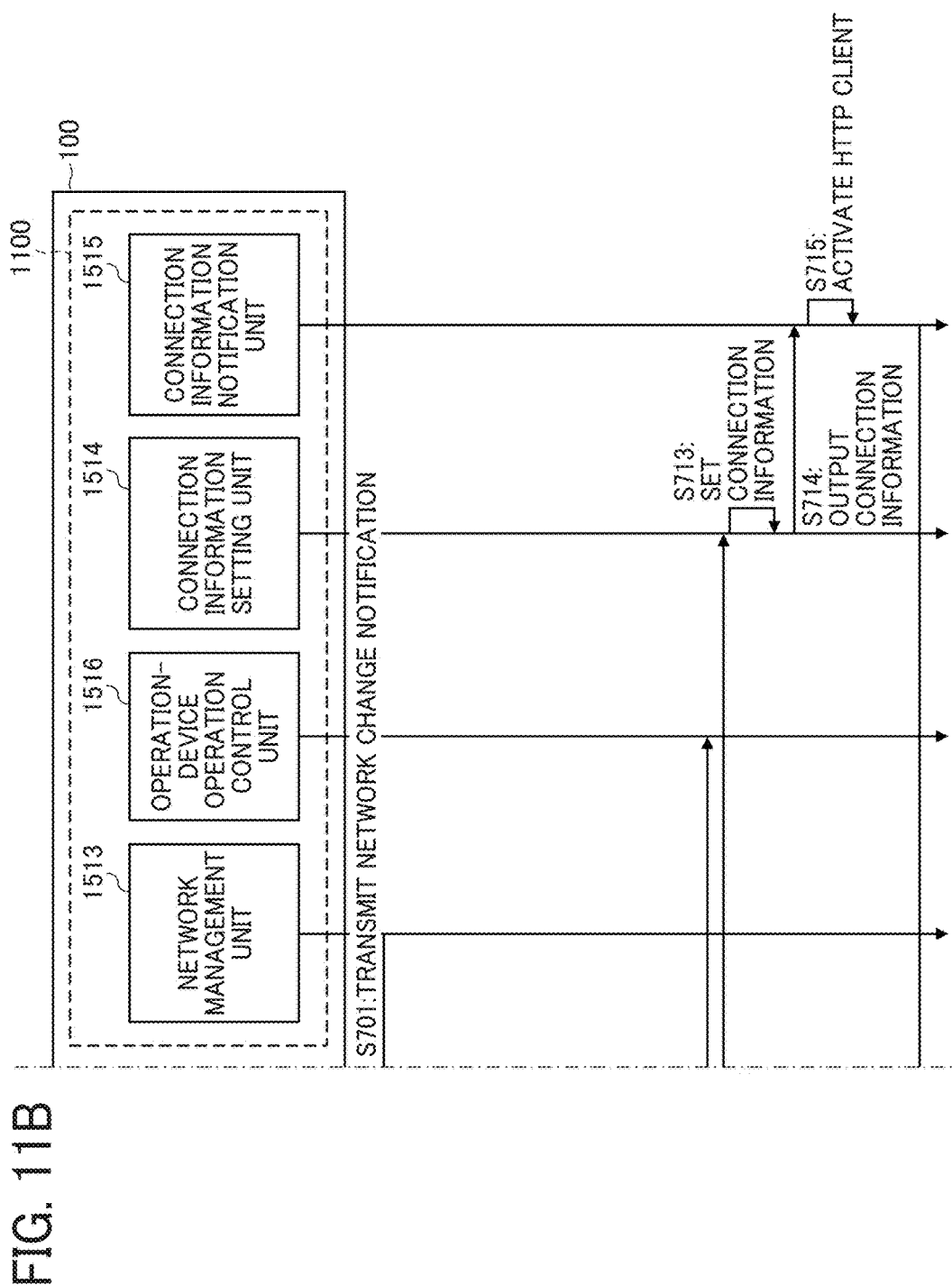

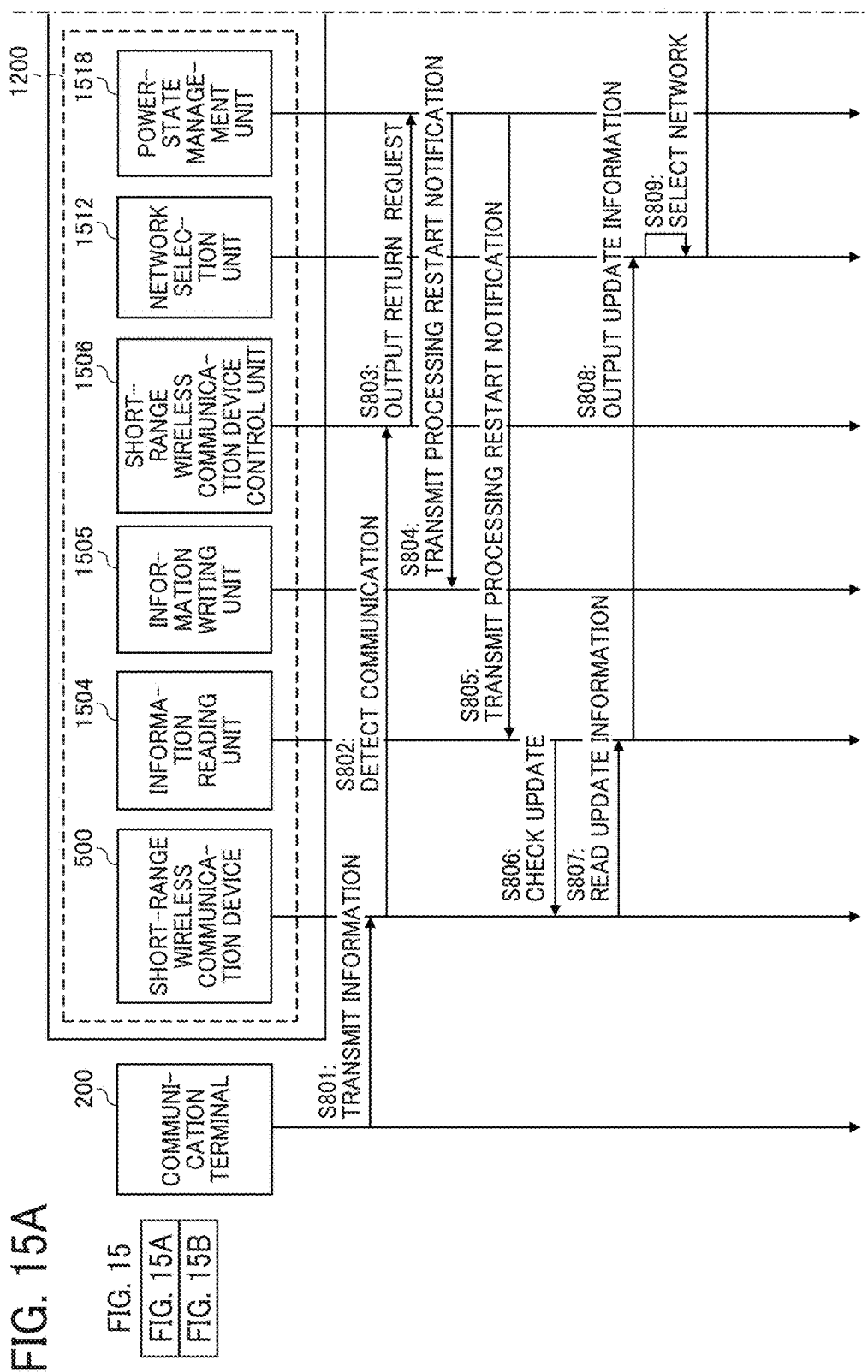

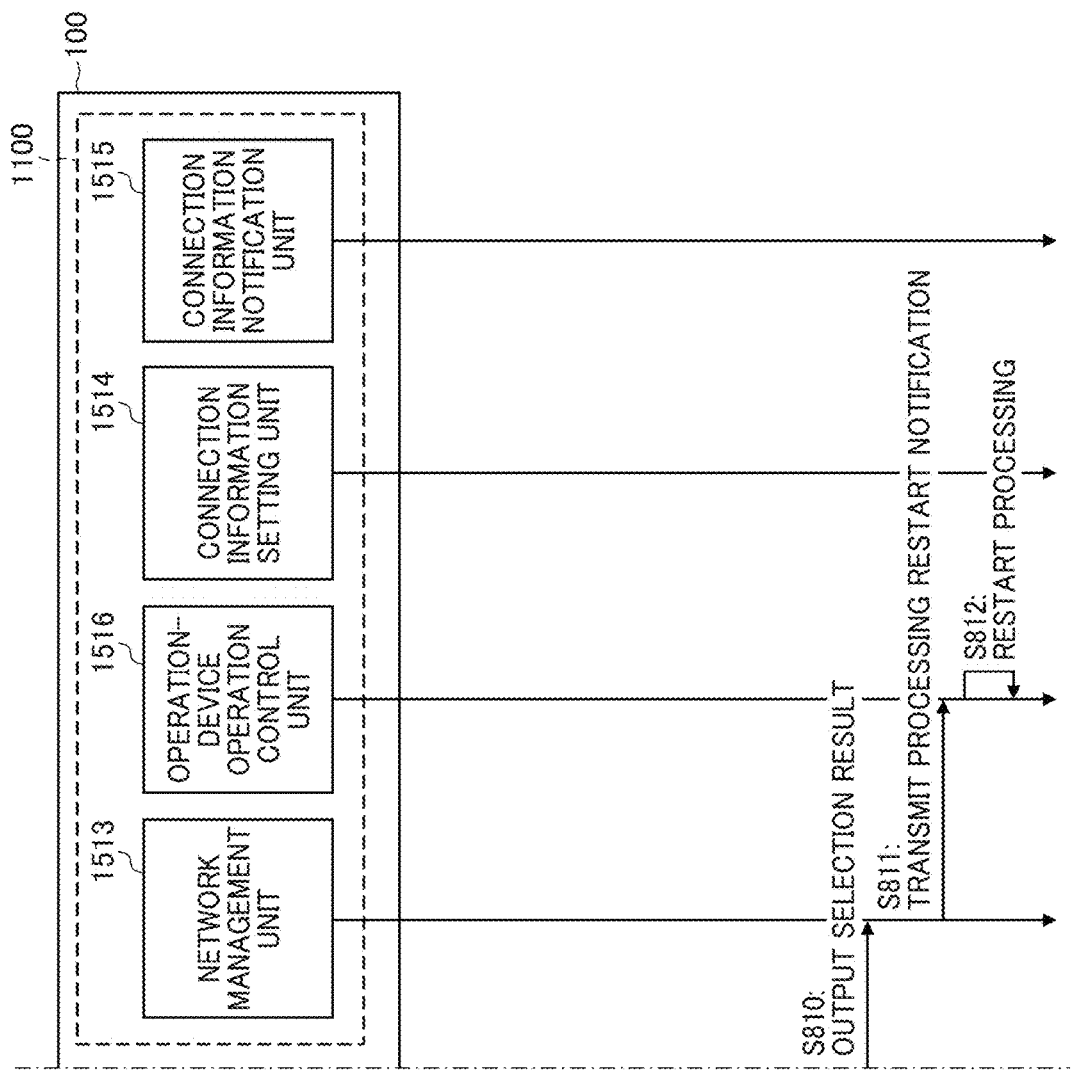

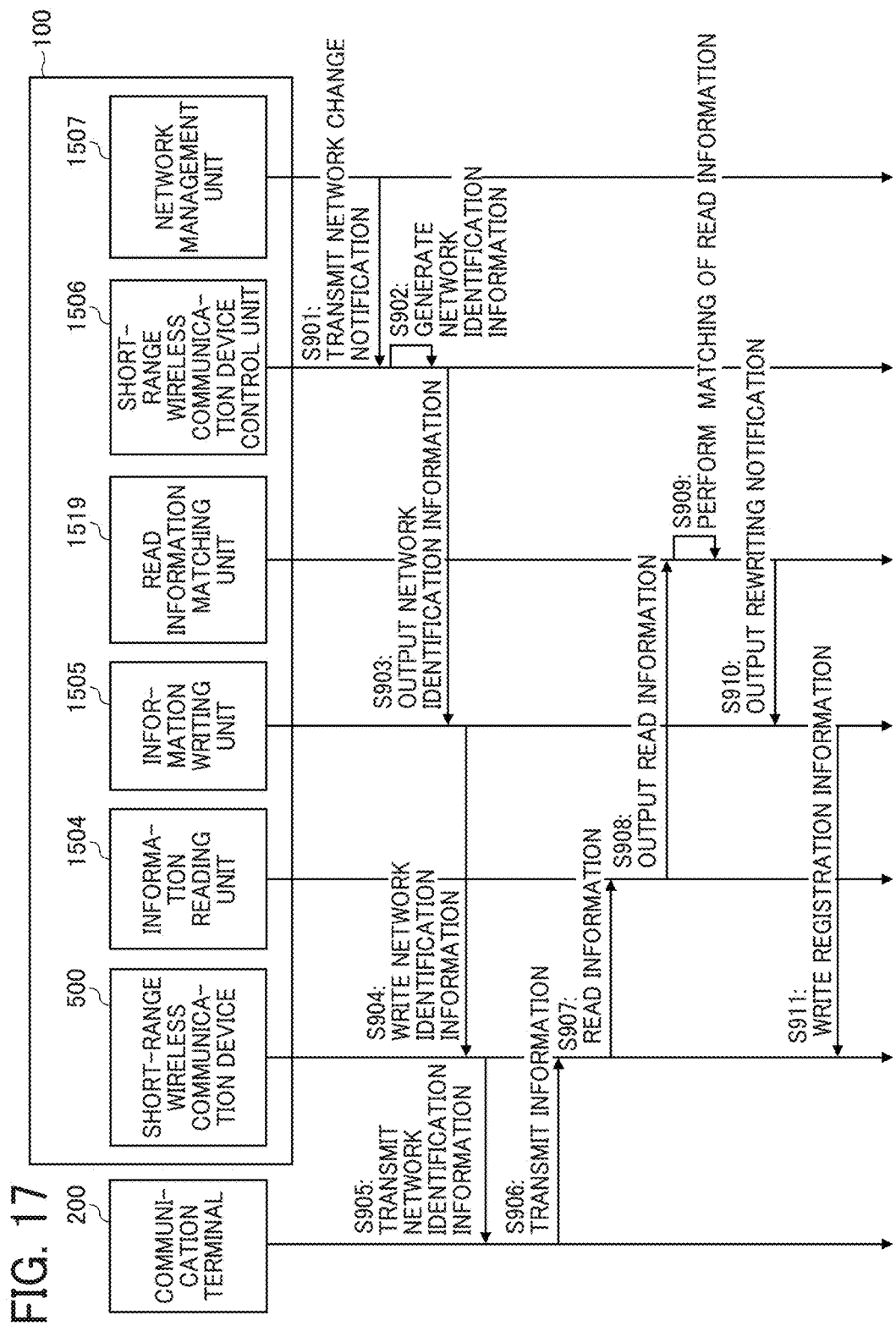

INFORMATION PROCESSING APPARATUS CONFIGURED TO NOTIFY A COMMUNICATION TERMINAL OF CONNECTION INFORMATION USED TO ESTABLISH A NETWORK CONNECTION BETWEEN AN INFORMATION PROCESSING APPARATUS AND THE COMMUNICATION TERMINAL, COMMUNICATION SYSTEM, AND COMMUNICATION METHOD CONFIGURED TO PERFORM SAME

CROSS-REFERENCE TO RELATED APPLICATION

This patent application is based on and claims priority pursuant to 35 U.S.C. § 119(a) to Japanese Patent Application No. 2017-112256, filed on Jun. 7, 2017 in the Japan Patent Office, the entire disclosure of which is hereby incorporated by reference herein.

BACKGROUND

Technical Field

Aspects of the present disclosure relate to an information processing apparatus, a communication system, a communication method, and a non-transitory recording medium storing a program.

Related Art

A service has become widespread that transmits photos and electronic documents stored in a communication terminal, such as a smartphone, having a wireless communication function to an information processing apparatus, such as a printer, by wireless communication and causes the information processing apparatus to print the information.

In order for the information processing apparatus, such as a printer, to execute wireless communication with the communication terminal, it is necessary for the information processing apparatus and the communication terminal to establish a communication path to form a network. As a method of establishing the communication path to form a network, for example, a technique is known of acquiring connection information necessary for executing wireless communication using short-range wireless communication, such as near field communication (NFC), and establishing a communication path based on the acquired connection information. According to the method, by simply bringing the communication terminal close to the information processing apparatus, the communication path between the communication terminal and the information processing apparatus can be established to form a network.

Such an information processing apparatus, such as a printer, may also support communication using a plurality of communication paths including, e.g., a communication path that communicates with a communication terminal via an access point or a communication path that directly communicates with a communication terminal without going through an access point.

SUMMARY

In an aspect of the present disclosure, there is provided an information processing apparatus includes circuitry to transmit network identification information of a network to a communication terminal via short-range wireless communication; acquire, from the communication terminal via short-range wireless communication, address information indicating an address on the Internet accessible by the communication terminal based on the network identification information; and notify a plurality of pieces of connection information of the communication terminal using the address information acquired from the communication terminal, the connection information to be used for establishing a connection between the information processing apparatus and the communication terminal through the network.

In another aspect of the present disclosure, there is provided a communication system that includes a communication terminal; an information processing apparatus to connect to the communication terminal via a network using at least one of the plurality of pieces of connection information; and circuitry to transmit network identification information of a network to a communication terminal via short-range wireless communication; acquire, from the communication terminal, address information indicating an address on the Internet accessible based on the network identification information; and notify the plurality of pieces of connection information of the communication terminal based on the address information acquired from the communication terminal.

In still another aspect of the present disclosure, there is provided a communication method that includes transmitting network identification information of a network to a communication terminal via short-range wireless communication; acquiring, from the communication terminal, address information indicating an address on the Internet accessible based on the network identification information; and notifying a plurality of pieces of connection information of the communication terminal based on the address information acquired from the communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram of an example of a functional configuration of a communication terminal according to the first embodiment;

FIG. 7 is a diagram of an example of a data format relating to notification of connection information;

FIG. 8 is a sequence diagram of an example of connection processing in the communication system according to the first embodiment;

FIG. 9 is a diagram of an example of a schematic configuration of a communication system according to a second embodiment of the present disclosure;

FIG. 15 consisting of FIGS. 15A and 15B is a sequence diagram of an example of process-restart processing in the communication system according to the third embodiment;

FIG. 17 is a sequence diagram of an example of matching processing of read information in the communication system according to the fourth embodiment.

Figure 1:
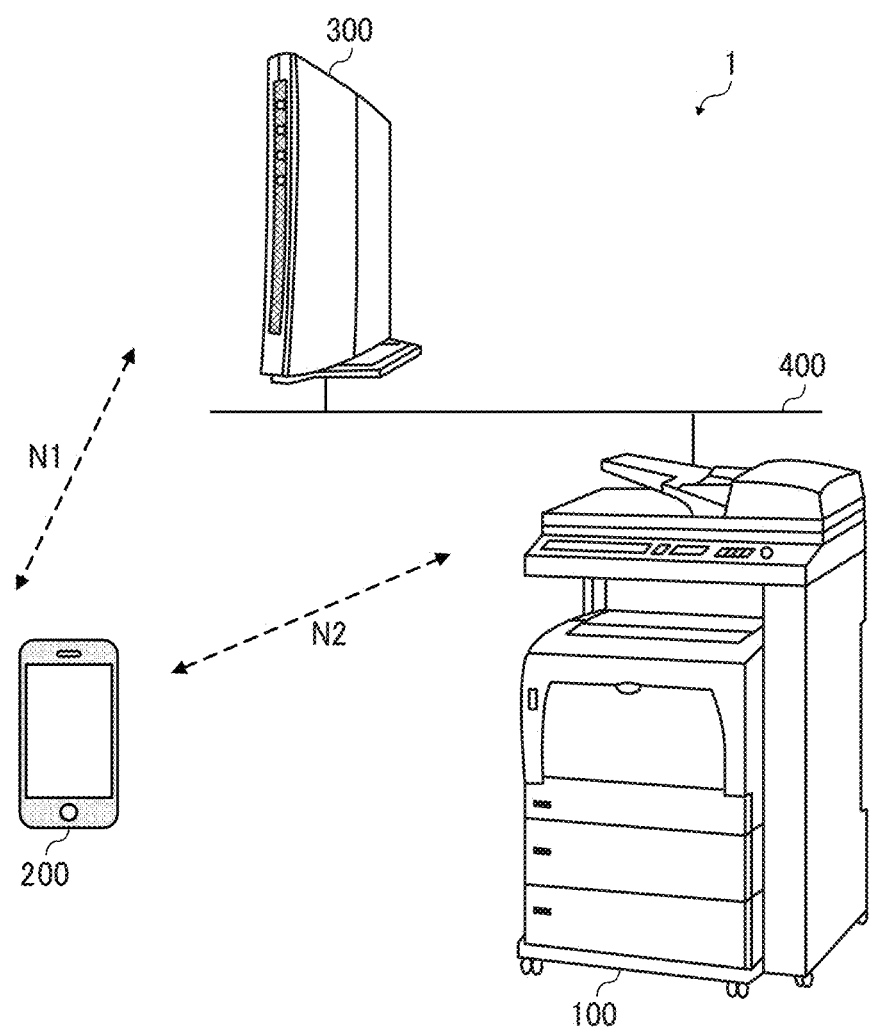
FIG. 1 is a diagram of an example of a system configuration of a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below with reference to the attached drawings.

<System Configuration>

FIG. 1 is a diagram of an example of a system configuration of a communication system according to an embodiment of the present disclosure. A communication system 1 according to the present embodiment is a system for realizing effective utilization of communication resources of an information processing apparatus 100. Upon receiving specific connection information from the information processing apparatus 100, a communication terminal 200 can connect to the information processing apparatus 100 via a network. The communication system 1 includes the information processing apparatus 100, the communication terminal 200, and a wireless access point 300. The communication system 1 enables the communication terminal 200 to connect to a communication line 400 via the wireless access point 300. Thus, communication can be established between the information processing apparatus 100 and the communication terminal 200 via a network N1. An example of the network N1 is a network (communication path) using an in-house LAN not via the Internet. In the communication system 1, the information processing apparatus 100 and the communication terminal 200 can be directly connected to establish communication via a network N2. An example of the network N2 is a network (communication path) using Wi-Fi Direct communication that allows the information processing apparatus 100 and the communication terminal 200 to be directly connected.

The information processing apparatus 100 is, for example, an image forming apparatus, such as a multifunction peripheral or a printer, having an image processing function. The information processing apparatus 100 executes image processing on jobs requested for printing, scanning, etc., transmitted from the communication terminal 200, such as a smartphone. The information processing apparatus 100 is not limited to the image forming apparatus, but may be, for example, an output apparatus, such as a scanner, a facsimile machine, or an image projecting apparatus (projector) or an output device, such as an electronic blackboard or a digital signage, a head up display (HUD) device, a sound output device, such as a speaker, an industrial machine, an imaging device, a sound collecting device, a medical device, or a network home appliance.

The communication terminal 200 is a communication device, such as a smartphone, that can be carried and operated by a user. The communication terminal 200 may be, for example, a mobile phone terminal, a tablet terminal, a game machine, a personal digital assistant (PDA), a digital camera, a wearable personal computer (PC), or a note PC.

The wireless access point 300 is connected to the information processing apparatus 100 via a local area network (LAN), such as Ethernet (registered trademark), to perform communication, and also communicates with the communication terminal 200 according to a wireless LAN standard, such as Institute of Electrical and Electronic Engineers (IEEE) 802.11.

The information processing apparatus 100 includes a Wi-Fi module operating in an infrastructure mode, a Wi-Fi Direct module capable of communicating directly with the communication terminal 200, and the like. In such a case, since the communication terminal 200 can communicate directly with the information processing apparatus 100 without going through the wireless access point 300, the wireless access point 300 can be obviated.

First Embodiment

Outline

Figure 2:
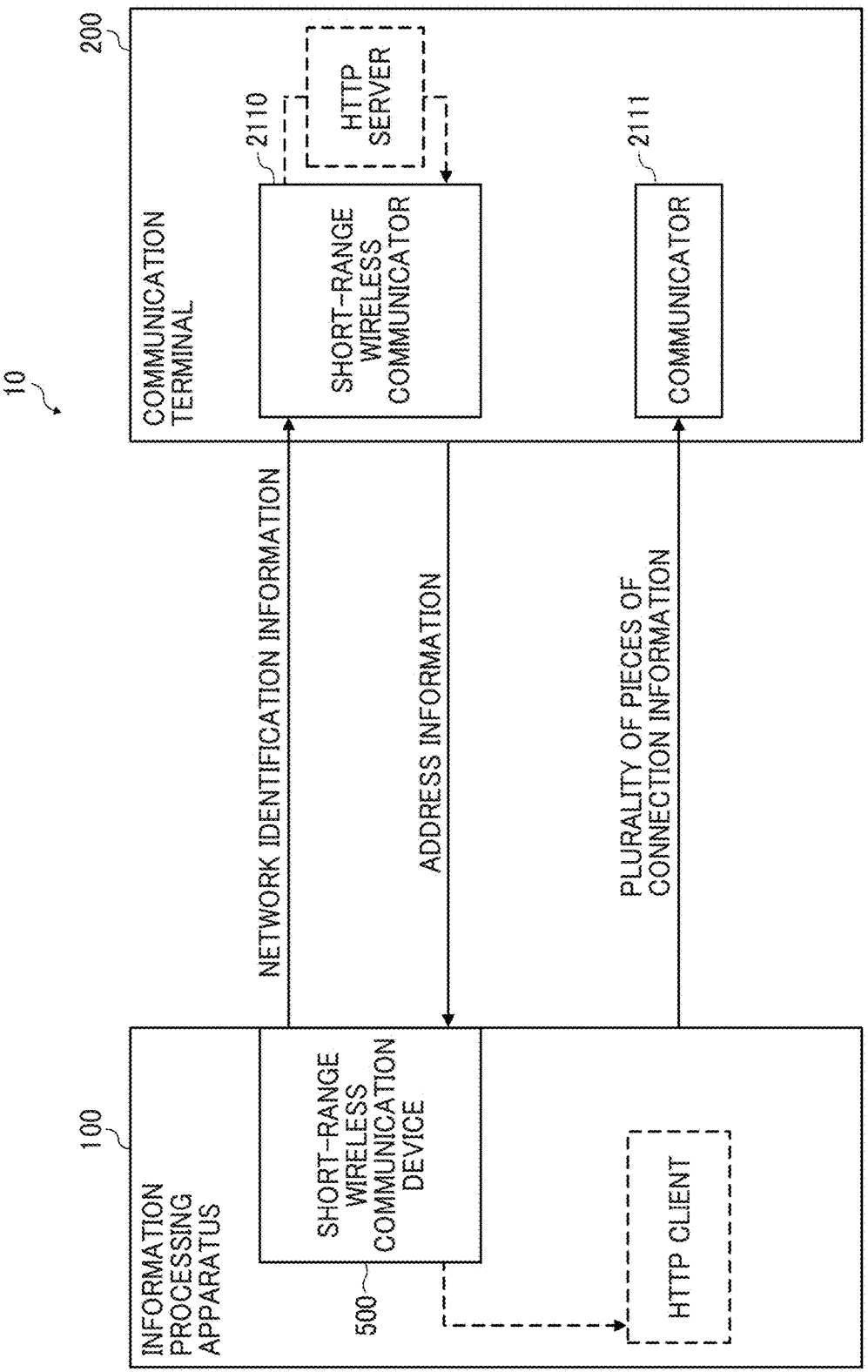
FIG. 2 is a diagram of an example of a schematic configuration of a communication system according to a first embodiment of the present disclosure.

FIG. 2 is a schematic diagram of an example of a communication system according to a first embodiment of the present disclosure. FIG. 2 illustrates that, in a communication system 10 according to the first embodiment, the information processing apparatus 100 and the communication terminal 200 can communicate using short-range wireless communication. The information processing apparatus 100 includes a short-range wireless communication device 500 having reader-and-writer functions capable of reading and writing information transmitted and received by short-range wireless communication. For the information processing apparatus 100, for example, an NFC tag is affixed to a housing of the information processing apparatus 100 as the short-range wireless communication device 500.

When the communication terminal 200 approaches within a range within which short-range wireless communication with the short-range wireless communication device 500 is available, the communication terminal 200 establishes short-range wireless communication with the short-range wireless communication device 500. The short-range wireless communication may be not only NFC but also Bluetooth (registered trademark), infrared communication, and the like.

Network identification information of a network used for connection with the communication terminal 200 using specific connection information is written in the short-range wireless communication device 500 of the information processing apparatus 100. The network identification information includes a service set identifier (SSID), a password, and the like. A communication method (communication path) for connecting via the network is a communication method with a wider communication range than the short-range wireless communication. The communication method is, for example, communication using wired or wireless LAN or Wi-Fi Direct.

FIG. 2 is a diagram of an example in which, when the information processing apparatus 100 establishes short-range wireless communication with the communication terminal 200 using the short-range wireless communication device 500, the information processing apparatus 100 transmits network identification information to the communication terminal 200 via short-range wireless communication. Upon receiving the network identification information from the information processing apparatus 100 via the short-range wireless communication, the communication terminal 200 activates a hypertext transfer protocol (HTTP) server and sets address information indicating an accessible address on the Internet based on the received network identification information. The address information is, for example, a uniform resource locator (URL) on a Web system accessible by the communication terminal 200. The communication terminal 200 transmits the set address information to the information processing apparatus 100 via short-range wireless communication.

As illustrated in FIG. 2, when the information processing apparatus 100 receives the address information from the communication terminal 200 via the short-range wireless communication device 500, the information processing apparatus 100 activates an HTTP client and, based on the received address information, notifies connection information of a plurality of networks from the information processing apparatus 100 to the communication terminal 200. The connection information includes address information on the network of the information processing apparatus 100 and is, for example, an Internet protocol (IP) address of the information processing apparatus 100.

In the communication system 10, as described above, the information processing apparatus 100 acquires the address information, which indicates an address on the Internet accessible by the communication terminal 200, from the communication terminal 200 via short-range wireless communication, and transmits the connection information of a plurality of networks to the communication terminal 200 based on the acquired address information. Here, in ordinary short-range wireless communication, since the amount of data that can be communicated at a time is limited. Accordingly, when a plurality of pieces of connection information is transmitted via short-range wireless communication, the plurality of pieces of connection information is transmitted one by one, or the format according to which the connection information is written is changed. Hence, by using the communication system 10, when the information processing apparatus 100 can connect to the communication terminal 200 using different communication paths, the communication resources of the information processing apparatus 100 can be effectively utilized.

Hardware Configuration

Figure 3:
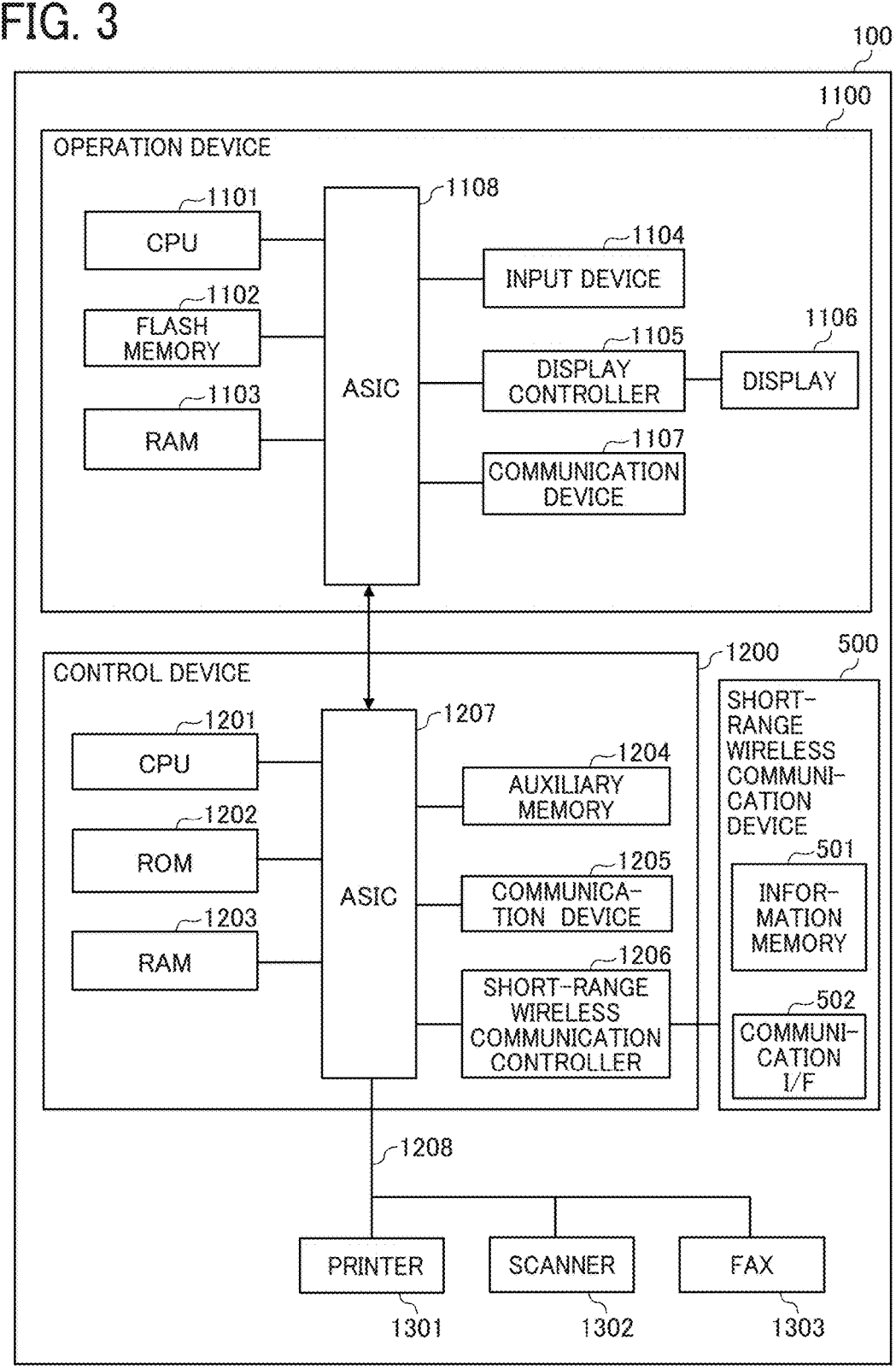
FIG. 3 is a diagram of an example of a hardware configuration of an information processing apparatus according to an embodiment of the present disclosure.

FIG. 3 is a diagram of an example of the hardware configuration of the information processing apparatus according to an embodiment of the present disclosure. Note that the hardware configuration illustrated in FIG. 3 may be the same configuration in each embodiment, or components may be added to or deleted from the hardware configuration illustrated in FIG. 3 as necessary. The information processing apparatus 100 includes, for example, an operation device 1100, a control device 1200, a printer 1301, a scanner 1302, a facsimile (fax) 1303, a short-range wireless communication device 500.

The operation device 1100 is connected to the control device 1200 using a universal serial bus (USB) cable or the like and is an interface for a user, such as an operator, to operate the information processing apparatus 100. By operating the operation device 1100, the information processing apparatus 100 can input data, execute a job, and display the job. A general information processing terminal can be applied to the operation device 1100. The operation device 1100 includes, for example, a central processing unit (CPU) 1101, a flash memory 1102, a random access memory (RAM) 1103, an input device 1104, a display control controller 1105, a display 1106, a communication device 1107, and an application specific integrated circuit (ASIC) 1108.

The CPU 1101 reads programs and data stored in the flash memory 1102 onto the RAM 1103 and executes processing to control the operation of the entire operation device 1100. The flash memory 1102 is a nonvolatile memory capable of holding programs and data even when the power is turned off. A software development kit (SDK) compatible with various uses is installed in the flash memory 1102, thus allowing creation of an application that achieves functions of the information processing apparatus 100, network connection, and the like, using the SDK. The RAM 1103 is a volatile memory used as a work area or the like of the CPU 1101.

The input device 1104 is an interface for an operator to input various instructions to the information processing apparatus 100. The input device 1104 is, for example, a keyboard, a mouse, a touch panel, or a voice input device.

The display control controller 1105 displays various information possessed by the information processing apparatus 100 on the display 1106 in the form of a cursor, a menu, a window, a character, an image, or the like in response to a request from the CPU 1101. The display control controller 1105 is, for example, a graphic chip or a display interface circuit.

The communication device 1107 is a communication device to perform communication (connection) via the network with the communication terminal 200 using specific connection information. A communication method used for communication (connection) via the network with the communication terminal 200 in the communication device 1107 is, for example, Wi-Fi Direct communication. The communication device 1107 includes, for example, an antenna, a radio unit, and a media access control (MAC) unit. For example, in the communication system 1 illustrated in FIG. 1, the communication device 1107 performs communication (connection) with the communication terminal 200 via the network N1 via a wired or wireless LAN. On the other hand, the communication device 1107 communicates (connects) with the communication terminal 200 via the network N2 using Wi-Fi Direct. The ASIC 1108 is an integrated circuit (IC) for image processing having a hardware element for image processing.

The control device 1200 plays a role as a main unit of the information processing apparatus 100. The control device 1200 includes, for example, a CPU 1201, a read only memory (ROM) 1202, a RAM 1203, an auxiliary memory 1204, a communication device 1205, a short-range wireless communication controller 1206, and an ASIC 1207.

The CPU 1201 reads programs and data stored in the ROM 1202 on the RAM 1203 and executes processing to control the operation of the entire information processing apparatus 100. The CPU 1201 is an arithmetic device that read the programs and data according to an embodiment of the present disclosure stored in the ROM 1202, the auxiliary memory 1204, and the like onto the RAM 1203 and execute processing to perform respective functions of the information processing apparatus 100. An SDK compatible with various uses is installed in the ROM 1202, thus allowing an application of the SDK to be used to achieve functions of the information processing apparatus 100, network connection, and the like. The RAM 1203 is a volatile memory used as a work area or the like of the CPU 1201.

The auxiliary memory 1204 is, for example, a storage device, such as a hard disk drive (HDD), a solid state drive (SSD), or a flash ROM, and stores an operation system (OS), an application program, various data, and the like. The communication device 1205 is a communication device to perform communication (connection) via the network with the communication terminal 200 using specific connection information. A communication method used for communication (connection) via the network with the communication terminal 200 in the communication device 1205 is, for example, wired or wireless LAN communication, Wi-Fi Direct communication, or the like. When a plurality of communication methods can be used, the communication device 1205 includes an antenna, a radio unit, a MAC unit, and the like corresponding to each communication method. Note that the communication device 1205 may have the same configuration as the communication device 1107 of the operation device 1100 described above. The information processing apparatus 100 communicates (connects) with the communication terminal 200 via the network by using either the communication device 1107 of the operation device 1100 or the communication device 1205 of the control device 1200.

The short-range wireless communication controller 1206 is a controller that controls communication in the short-range wireless communication device 500. The ASIC 1207 is an IC for image processing having a hardware element for image processing. The printer 1301 has a sheet feeding unit, a drum writing unit, a transfer unit, and a sheet ejection unit, and is a device that prints data of characters and images read from an original on a sheet of paper. The scanner 1302 is a scanner engine that optically reads an original and generates scanned data. The scanner 1302 includes a light source to irradiate the original with reading light, an image sensor to detect reflected light from the original, and the like. The facsimile 1303 is a device that performs the facsimile function.

The short-range wireless communication device 500 is an IC tag having a short-range wireless communication function. The short-range wireless communication device 500 incorporates a communication interface (I/F) 502 to perform short-range wireless communication with the information memory 501. In the short-range wireless communication device 500, information for communication with an external device, such as the communication terminal 200, is stored in advance in the information memory 501. The short-range wireless communication device 500 is connected to the short-range wireless communication controller 1206 of the control device 1200 and transmits, e.g., control information of the information processing apparatus 100 based on the information received from the external device, such as the communication terminal 200, using the short-range wireless communication. The short-range wireless communication device 500 is an external device for the information processing apparatus 100 and is attached to, for example, the information processing apparatus 100. Although the position at which the short-range wireless communication device 500 is attached to the information processing apparatus 100 is not particularly limited, the short-range wireless communication device 500 is preferably attached to a position at which short-range wireless communication with the communication terminal 200 is easily available.

Figure 4:
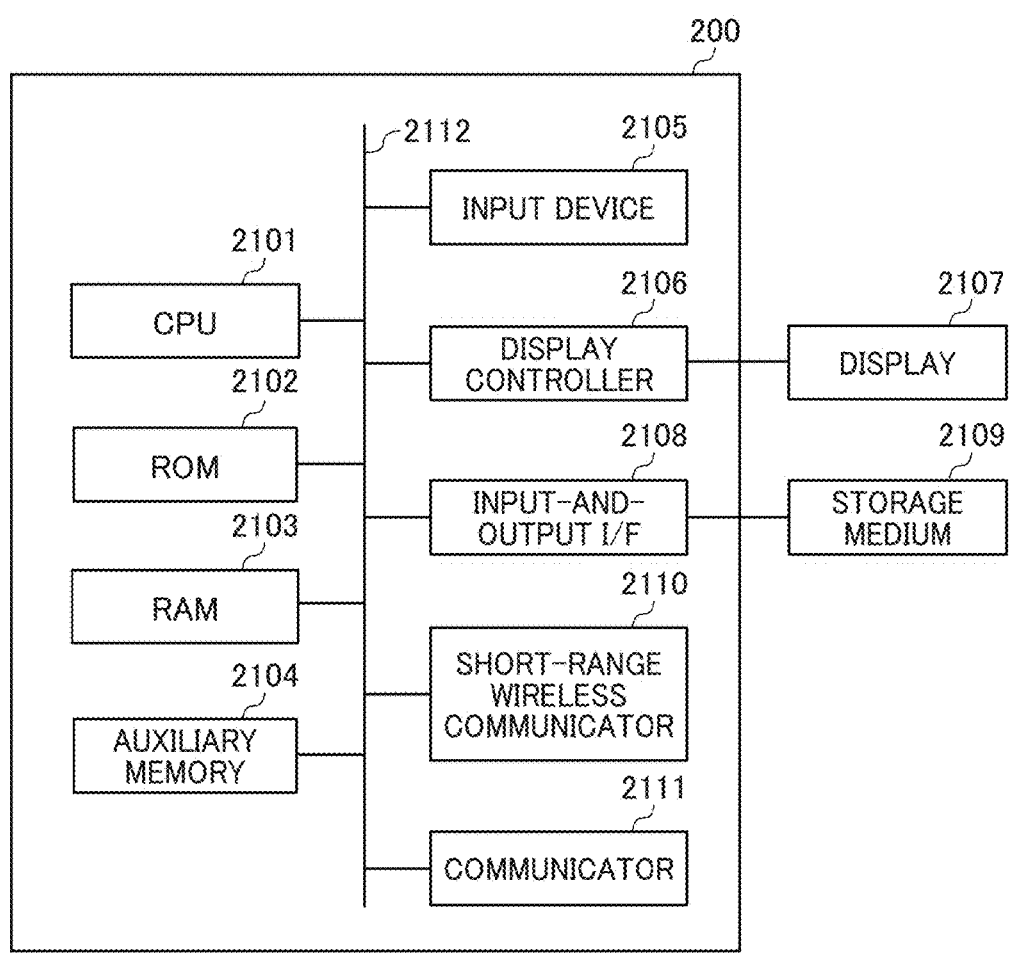
FIG. 4 is a diagram of an example of a hardware configuration of a communication terminal according to an embodiment of the present disclosure.

FIG. 4 is a diagram of an example of the hardware configuration of the communication terminal according to an embodiment of the present disclosure. Note that the hardware configuration illustrated in FIG. 4 may be the same configuration in each embodiment, or components may be added to or deleted from the hardware configuration illustrated in FIG. 4 as necessary. The communication terminal 200 includes, for example, a CPU 2101, a ROM 2102, a RAM 2103, an auxiliary memory 2104, an input device 2105, a display controller 2106, a display 2107, an input-and-output OF 2108, a storage medium 2109, a short-range wireless communicator 2110, and a wireless communicator 2111.

The CPU 2101 controls the entire communication terminal 200. The CPU 2101 reads programs and data according to an embodiment of the present disclosure stored in the ROM 2102, the auxiliary memory 2104, and the like onto the RAM 2103 and executes processing to perform the respective functions of the communication terminal 200. The RAM 2103 is a volatile memory used as a work area or the like of the CPU 2101. The ROM 2102 is a nonvolatile memory capable of holding programs and data even when the power is turned off.

The auxiliary memory 2104 is, for example, a storage device, such as an HDD, an SSD, or a flash ROM, and stores an OS, an application program, various data, and the like. The input device 2105 is an interface for an operator to input various instructions to the communication terminal 200. The input device 2105 is, for example, a keyboard, a mouse, a touch panel, a voice input device, or the like.

The display controller 2106 displays various information possessed by the communication terminal 200 on the display 2107 in the form of a cursor, a menu, a window, a character, an image, or the like in response to a request from the CPU 2101. The display controller 2106 is, for example, a graphic chip or a display interface. The input-and-output interface 2108 is an interface for connecting a USB cable or various storage media 2109 such as a USB memory.

The short-range wireless communicator 2110 is a wireless communicator to perform short-range wireless communication. The short-range wireless communicator 2110 includes, for example, an antenna, a wireless unit, a MAC unit, and the like. The communicator 2111 is a communicator that communicates (connects) with the information processing apparatus 100 via a network using specific connection information. The communicator 2111 includes an antenna, a radio unit, a MAC unit, and the like corresponding to each communication when communication by a plurality of communication methods is available.

The bus 2112 is connected to each of the above-described components and transmits an address signal, a data signal, various control signals, and the like. The CPU 2101, the ROM 2102, the RAM 2103, the auxiliary memory 2104, the input device 2105, the display controller 2106, the input-and-output interface 2108, the short-range wireless communicator 2110, and the communicator 2111 are mutually connected via the bus 2112.

Figure 5:
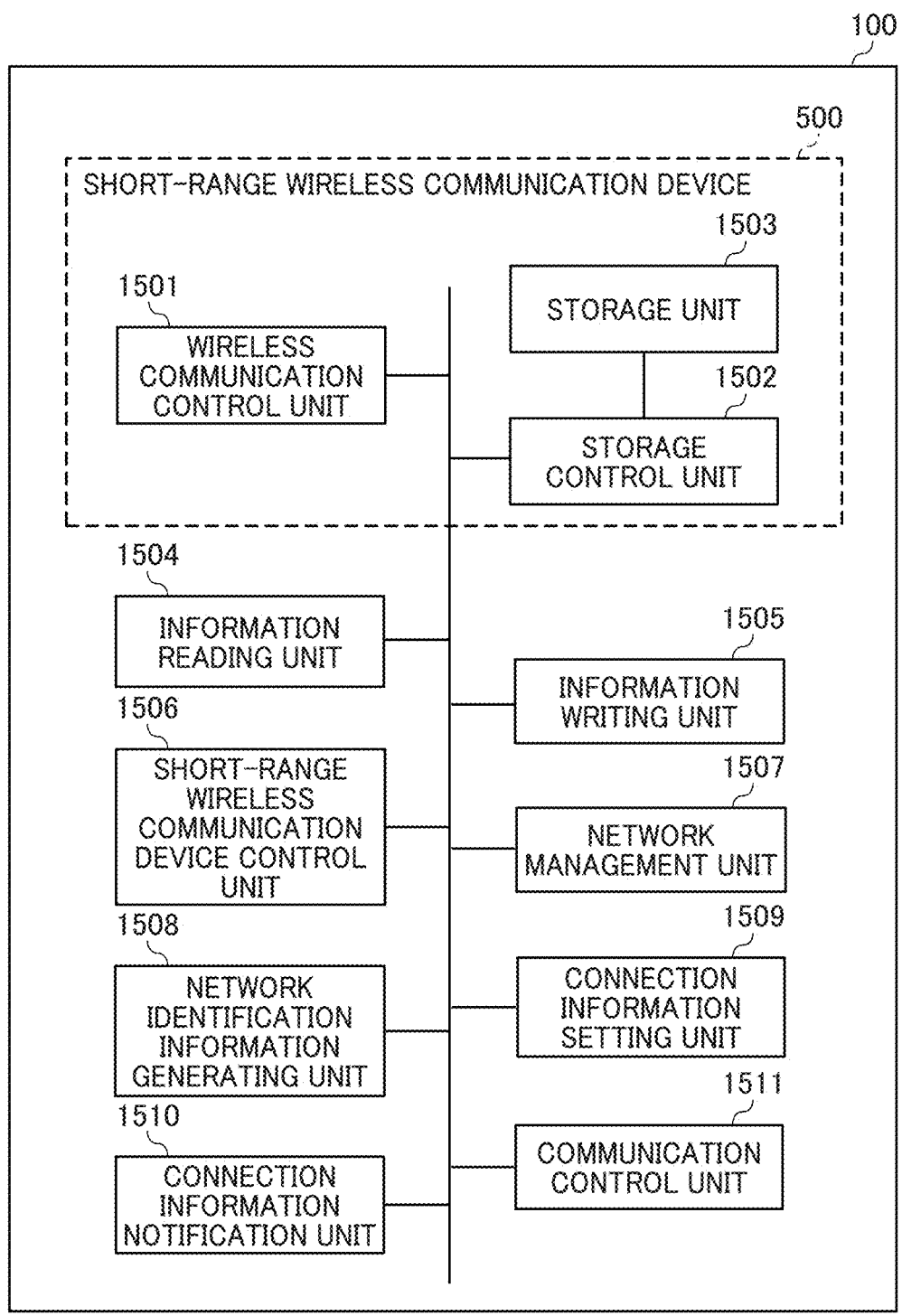
FIG. 5 is a diagram of an example of a functional configuration of the information processing apparatus according to the first embodiment.

Functional configuration FIG. 5 is a diagram of an example of a functional configuration of the information processing apparatus according to the first embodiment. Functions of the information processing apparatus 100 illustrated in FIG. 5 are implemented by the control device 1200 and the short-range wireless communication device 500 of the information processing apparatus 100 illustrated in FIG. 3. Functions implemented by the information processing apparatus 100 include a wireless communication control unit 1501, a storage control unit 1502, a storage unit 1503, an information reading unit 1504, an information writing unit 1505, a short-range wireless communication device control unit 1506, a network management unit 1507, a network identification information generating unit 1508, a connection information setting unit 1509, a connection information notification unit 1510, and a communication control unit 1511.

The wireless communication control unit 1501, the storage control unit 1502, and the storage unit 1503 are functions implemented by the short-range wireless communication device 500 of the information processing apparatus 100.

The wireless communication control unit 1501 is a function of controlling short-range wireless communication performed with the communication terminal 200. The wireless communication control unit 1501 transmits, for example, the network identification information to the communication terminal 200 via short-range wireless communication. The wireless communication control unit 1501 receives, from the communication terminal 200, address information indicating an accessible address on the Internet based on network identification information via short-range wireless communication. Short-range wireless communication is NFC, Bluetooth (registered trademark), infrared communication, or the like. Note that the format of data that can be communicated via short-range wireless communication by the wireless communication control unit 1501 may have any configuration as long as it is a predetermined format. For example, when the short-range wireless communication device 500 is an NFC tag, it is preferable to use a format of NFC data exchange format (NDEF). Here, in ordinary short-range wireless communication, since the amount of data that can be communicated at a time is limited. Accordingly, when a plurality of pieces of connection information is transmitted via short-range wireless communication, the plurality of pieces of connection information is transmitted one by one, or the format according to which the connection information is written is changed. The wireless communication control unit 1501 is implemented by a program executed by the communication I/F 502 of the short-range wireless communication device 500 illustrated in FIG. 3 and the short-range wireless communication controller 1206 and the CPU 1201 of the information processing apparatus 100. The wireless communication control unit 1501 is an example of a transmission unit.

The storage control unit 1502 is a function of causing the storage unit 1503 to store information transmitted and received via the short-range wireless communication with, e.g., the communication terminal 200 that is an external device. When the wireless communication control unit 1501 receives the information transmitted from the communication terminal 200 via the short-range wireless communication, the storage control unit 1502 stores the received information in the storage unit 1503. The storage control unit 1502 causes the storage unit 1503 to store the information written by the information writing unit 1505. The storage control unit 1502 is implemented by, for example, a program executed by the short-range wireless communication controller 1206 and the CPU 1201 of the information processing apparatus 100 illustrated in FIG. 3.

The storage unit 1503 is a function of storing the information received by the wireless communication control unit 1501 and the information written by the information writing unit 1505. For example, the storage unit 1503 is implemented by the information memory 501 of the short-range wireless communication device 500 illustrated in FIG. 3. The storage unit 1503 is an example of a storage unit.

The information reading unit 1504, the information writing unit 1505, the short-range wireless communication device control unit 1506, the network management unit 1507, the network identification information generating unit 1508, the connection information setting unit 1509, the connection information notification unit 1510, and the communication control unit 1511 are functions implemented by the control device 1200 of the information processing apparatus 100.

The information reading unit 1504 is a function of reading information stored in the storage unit 1503 of the short-range wireless communication device 500. When the information received from the communication terminal 200 via the short-range wireless communication by the wireless communication control unit 1501 is stored in the storage unit 1503, the information reading unit 1504 reads the stored information. For example, when the storage unit 1503 stores the address information received by the wireless communication control unit 1501 that indicates an accessible address on the Internet based on the network identification information, the information reading unit 1504 acquires the stored address information. The information reading unit 1504 is implemented by, for example, a program executed by the CPU 1201 of the information processing apparatus 100 illustrated in FIG. 3. The information reading unit 1504 is an example of an acquisition unit.

The information writing unit 1505 is a function of writing information to be communicated with the communication terminal 200, which is an external device, via short-range wireless communication, to the storage unit 1503 of the short-range wireless communication device 500. The information writing unit 1505 outputs the information to be written to the short-range wireless communication device 500. The output information is stored in the storage unit 1503 by the storage control unit 1502. The information writing unit 1505 writes the network identification information of a network formed with the communication terminal 200 into the storage unit 1503. The information writing unit 1505 is implemented by, for example, a program executed by the CPU 1201 of the information processing apparatus 100 illustrated in FIG. 3. The information writing unit 1505 is an example of a writing unit.

The short-range wireless communication device control unit 1506 is a function of controlling the short-range wireless communication device 500. The short-range wireless communication device control unit 1506 is implemented by, for example, a program executed by the short-range wireless communication controller 1206 and the CPU 1201 of the information processing apparatus 100 illustrated in FIG. 3.

The network management unit 1507 is a function of managing a network used for connection between the information processing apparatus 100 and the communication terminal 200 using specific connection information. For example, when the managed network is changed, the network management unit 1507 outputs a network change notification. Specifically, the network management unit 1507 pre-stores the network identification information, which is described later, and periodically reads the stored network identification information. If the stored network identification information differs from newly-acquired network identification information, the network management unit 1507 determines that the network has been changed, and outputs the network change notification. Change of the network is, for example, change of the default gateway. The network management unit 1507 is implemented by, for example, a program executed by the CPU 1201 of the information processing apparatus 100 illustrated in FIG. 3.

The network identification information generating unit 1508 is a function of generating network identification information of a network used for connection with the communication terminal 200. For example, when detecting the network change notification output from the network management unit 1507, the network identification information generating unit 1508 generates network identification information of the changed network. The network identification information includes, for example, an SSID, an encryption method, and a password. The network identification information generating unit 1508 is implemented by, for example, a program executed by the CPU 1201 of the information processing apparatus 100 illustrated in FIG. 3.

The connection information setting unit 1509 is a function of setting the connection information of a network used for connection with the communication terminal 200. The connection information includes, for example, address information of the information processing apparatus 100 on the network, and is, for example, an IP address of the information processing apparatus 100. The connection information setting unit 1509 is implemented by, for example, a program executed by the CPU 1201 of the information processing apparatus 100 illustrated in FIG. 3.

The connection information notification unit 1510 notifies the communication terminal 200 of the connection information set by the connection information setting unit 1509, based on the address information acquired by the information reading unit 1504. Specifically, when the connection information is set by the connection information setting unit 1509, the connection information notification unit 1510 activates an HTTP client executed on the information processing apparatus 100. Here, the HTTP client is, for example, software capable of exchanging information with an HTTP server using an HTTP communication protocol. In the information processing apparatus 100, the above-described software is installed in advance and is in an executable state on the information processing apparatus 100. Note that the function of the software may be provided in an external device and the information processing apparatus 100 may access the external device having the function of the software to activate the HTTP client. The connection information notification unit 1510 notifies the communication terminal 200 of the connection information of a plurality of networks as an HTTP request, based on the address information acquired by the information reading unit 1504. The connection information notification unit 1510 is implemented by, for example, a program executed by the CPU 1201 of the information processing apparatus 100 illustrated in FIG. 3. The connection information notification unit 1510 is an example of a notification unit.

Details of the notification of the connection information by the connection information notification unit 1510 is described below. FIG. 7 is a diagram of an example of a data format relating to the notification of connection information. The connection information illustrated in FIG. 7 is notified using a data format of Java Script Object Notation (JSON) format.

The item "machine" includes connection information of the control device 1200 via a wired or wireless LAN, and information of "ip" and "iptype" is set. The item "ip" includes the IP address. The item "iptype" includes the type of IP network, such as IPv4 or IPv6. The item "machine_wifi" includes connection information of the control device 1200 via the Wi-Fi Direct. Similarly with the item "machine", information of "ip" and "iptype" is set. The item "panel_wifi" includes connection information of the operation device 1100 via Wi-Fi Direct. Similarly with the item "machine", information of "ip" and "iptype" is set.

The information processing apparatus 100 can notify a plurality of pieces of connection information in different networks at once by transmitting the connection information of the information processing apparatus 100 as illustrated in FIG. 7. Further, for example, even when a network interface card (NIC) is installed as an expansion card to the information processing apparatus 100, it is possible to easily add the connection information of the expanded network. The data format relating to the notification of the connection information is not limited to the above-described format, and for example, an extensible markup language (XML) format may be used.

Returning to FIG. 5, the functional configuration of the information processing apparatus 100 is further described. The communication control unit 1511 is a function of controlling communication via a network between the information processing apparatus 100 and the communication terminal 200. The communication control unit 1511 controls communication with the communication terminal 200 via the network, based on the network identification information of the network generated by the network identification information generating unit 1508 and the connection information set by the connection information setting unit 1509. The communication control unit 1511 is implemented by, for example, a program executed by the communication device 1205, the CPU 1201, and the like of the information processing apparatus 100 illustrated in FIG. 3. The communication control unit 1511 can control communication with the communication terminal 200 according to a plurality of communication methods. Communication according to a plurality of communication methods includes, for example, LAN communication and Wi-Fi Direct communication. In the plurality of communication methods, communication is performed based on connection information specific to each communication method. Accordingly, the connection information of the network is different between the plurality of communication methods. The information processing apparatus 100 can connect to the communication terminal 200 via a network using a communication method based on specific connection information.

FIG. 6 is a diagram of an example of the functional configuration of the communication terminal according to the first embodiment. The functions implemented by the communication terminal 200 are functions including a short-range wireless communication control unit 2501, a network identification information acquisition unit 2502, an address information notification unit 2503, a connection information acquisition unit 2504, and a communication control unit 2505.

The short-range wireless communication control unit 2501 is a function of controlling short-range wireless communication performed with the short-range wireless communication device 500. When the short-range wireless communication control unit 2501 approaches within a range in which short-range wireless communication is available with the short-range wireless communication device 500 included in the information processing apparatus 100, the short-range wireless communication control unit 2501 establishes short-range wireless communication with the short-range wireless communication device 500. The short-range wireless communication control unit 2501 is implemented by, for example, a program executed by the short-range wireless communicator 2110, the CPU 2101, and the like of the communication terminal 200 illustrated in FIG. 4.

The network identification information acquisition unit 2502 is a function of acquiring network identification information transmitted from the wireless communication control unit 1501 of the information processing apparatus 100 via short-range wireless communication. When short-range wireless communication with the short-range wireless communication device 500 is established by the short-range wireless communication control unit 2501, the network identification information acquisition unit 2502 acquires the network identification information from the information processing apparatus 100 via the established short-range wireless communication. The network identification information acquisition unit 2502 is implemented by, for example, a program executed by the short-range wireless communicator 2110, the CPU 2101, and the like of the communication terminal 200 illustrated in FIG. 4.

The address information notification unit 2503 is a function of notifying the information processing apparatus 100 of address information indicating an accessible address on the Internet based on the network identification information via the short-range wireless communication. Specifically, when the network identification information acquisition unit 2502 acquires the network identification information, the address information notification unit 2503 activates an HTTP server. Here, the HTTP server is server software that provides information and functions to a computer of a user side (client) on a Web system via the network. In the communication terminal 200, the above-described software is installed in advance and is in a state in which the software can be executed on the communication terminal 200. When the HTTP server is activated, the address information notification unit 2503 sets address information indicating an accessible address on the Internet, based on the received network identification information. The address information notification unit 2503 notifies the information processing apparatus 100 of the address information via the short-range wireless communication. The address information is a URL or the like. The address information notification unit 2503 is implemented by, for example, a program executed by the short-range wireless communicator 2110, the CPU 2101, and the like of the communication terminal 200 illustrated in FIG. 4.

The connection information acquisition unit 2504 is a function of acquiring the connection information of the network transmitted from the information processing apparatus 100 using the address information. Specifically, the connection information acquisition unit 2504 accesses the URL to acquire the connection information stored in the URL notified to the information processing apparatus 100. The connection information acquisition unit 2504 is implemented by, for example, a program executed by the communicator 2111, the CPU 2101, and the like of the communication terminal 200 illustrated in FIG. 4.

The communication control unit 2505 is a function of controlling communication with the information processing apparatus 100 via a network using specific connection information. The communication control unit 2505 controls communication with the information processing apparatus 100 via a network, based on the network identification information acquired by the network identification information acquisition unit 2502 and the connection information acquired by the connection information acquisition unit 2504. The communication control unit 2505 is implemented by, for example, a program executed by the communicator 2111, the CPU 2101, and the like of the communication terminal 200 illustrated in FIG. 4.

Connection Processing

FIG. 8 is a sequence diagram of an example of connection processing in the communication system according to the first embodiment. In step S601, when the network is changed, the network management unit 1507 of the information processing apparatus 100 outputs a network change notification. Specifically, the network management unit 1507 determines that the network has been changed when, e.g., a change in the default gateway is detected, and outputs the network change notification.

In step S602, upon detecting the network change notification, the network identification information generating unit 1508 of the information processing apparatus 100 generates network identification information of the network after the change. Specifically, the network identification information generating unit 1508 sets an SSID, an encryption method, a password, and the like, which are identification information of the network after the change. In step S603, the network identification information generating unit 1508 of the information processing apparatus 100 outputs the generated network identification information to the information writing unit 1505.

In step S604, the information writing unit 1505 of the information processing apparatus 100 writes the network identification information to the short-range wireless communication device 500. Specifically, the information writing unit 1505 outputs the network identification information to the storage control unit 1502 of the short-range wireless communication device 500. The storage control unit 1502 stores the output network identification information in the storage unit 1503. When the network has not been changed and the network identification information has been written in the storage unit 1503 in advance, the processing from step S601 to S604 may not be performed.

In step S605, the wireless communication control unit 1501 of the information processing apparatus 100 transmits the network identification information written in the storage unit 1503 via the short-range wireless communication to the communication terminal 200. Specifically, when the short-range wireless communication device 500 of the information processing apparatus 100 detects the communication terminal 200 that has approached the range within which short-range wireless communication is available, the short-range wireless communication device 500 establishes short-range wireless communication with the communication terminal 200. The wireless communication control unit 1501 transmits the network identification information to the communication terminal 200 via the established short-range wireless communication.

In step S606, when the communication terminal 200 acquires the network identification information from the information processing apparatus 100 by the network identification information acquisition unit 2502, the communication terminal 200 activates the HTTP server based on the acquired network identification information. The HTTP server is server software that provides information and functions to a computer of the user side (client) on a Web system via a network. By obtaining the network identification information of the network from the information processing apparatus 100, the communication terminal 200 can connect to the Internet. The communication terminal 200 connects to the Internet using the acquired network identification information and activates the HTTP server.

In step S607, the communication terminal 200 transmits the address information, which indicates an accessible address on the Internet based on the network identification information, to the information processing apparatus 100 via short-range wireless communication. Specifically, the address information notification unit 2503 of the communication terminal 200 notifies the information processing apparatus 100 of the address information of the activated HTTP server, that is, the address information, such as the URL on the WEB, via short-range wireless communication. The address information is a URL or the like, and is written on the data format of the short-range wireless communication.

In step S608, the information reading unit 1504 of the information processing apparatus 100 reads the address information received by the short-range wireless communication device 500. Specifically, the information reading unit 1504 acquires the address information received by the wireless communication control unit 1501 and written in the storage unit 1503 by the storage control unit 1502. In step S609, the information reading unit 1504 of the information processing apparatus 100 outputs the acquired address information to the connection information setting unit 1509.

In step S610, when the connection information setting unit 1509 of the information processing apparatus 100 detects the output address information, the connection information setting unit 1509 sets the connection information of the network. The connection information of the network includes address information of the information processing apparatus 100 on the network, and is, for example, an IP address of the information processing apparatus 100. In step S611, the connection information setting unit 1509 of the information processing apparatus 100 outputs the set connection information to the connection information notification unit 1510.

In step S612, when the connection information notification unit 1510 of the information processing apparatus 100 detects the output connection information, the connection information notification unit 1510 activates an HTTP client. The HTTP client is software capable of exchanging information with an HTTP server by sending an HTTP request using, for example, an HTTP communication protocol. The information processing apparatus 100 activates the HTTP client by executing a program of the software stored in advance.

In step S613, the connection information notification unit 1510 of the information processing apparatus 100 notifies the communication terminal 200 of a plurality of pieces of connection information based on the address information acquired from the communication terminal 200 by the activated HTTP server. Specifically, the connection information notification unit 1510 accesses the URL indicated by the address information acquired by the information reading unit 1504, and writes the plurality of pieces of connection information at the position indicated by the URL to send the plurality of pieces of connection information to the communication terminal 200. Accordingly, the communication terminal 200 can connect to the information processing apparatus 100 via the network, based on the network identification information and the connection information of the network acquired from the information processing apparatus 100.

As described above, according to the first embodiment, the information processing apparatus 100 acquires the address information on the Internet accessible by the communication terminal 200 via short-range wireless communication, and transmits connection information of a plurality of networks, based on the acquired address information. Accordingly, when the information processing apparatus 100 can connect to the communication terminal 200 using different communication paths, the communication resources of the information processing apparatus 100 can be effectively utilized.

Furthermore, the information processing apparatus 100 does not transmit all of the information for connecting to the communication terminal 200 via a network, via short-range wireless communication, but transmits the connection information of the information processing apparatus 100, which is part of the information for connecting to the communication terminal 200 via a network, via the Internet. Such a configuration can more enhance the security of communication between the information processing apparatus 100 and the communication terminal 200 than a method of transmitting information using only the short-range wireless communication.

Second Embodiment

Subsequently, the communication system according to a second embodiment of the present disclosure is described below. Note that the same configurations and the same functions as those in the first embodiment are denoted by the same reference numerals, and redundant descriptions thereof are omitted below.

Outline

FIG. 9 is a schematic diagram of an example of a communication system according to the second embodiment. In the communication system 20 illustrated in FIG. 9, similarly with the first embodiment, the information processing apparatus 100 and the communication terminal 200 can perform short-range wireless communication. Further, as in the first embodiment, the information processing apparatus 100 transmits network identification information from the communication terminal 200 via the short-range wireless communication. When acquiring the network identification information, the communication terminal 200 activates the HTTP server. The communication terminal 200 transmits the address information indicating an accessible address on the Internet based on the network identification information, to the communication terminal 200 via short-range wireless communication.

The information processing apparatus 100 illustrated in FIG. 9 includes an operation device 1100 that can be connected to the communication terminal 200 via a network, separately from the control device 1200 that achieves a role as a main unit. The operation device 1100 and the control device 1200 can connect to the communication terminal 200 via the network using specific connection information. Specifically, the operation device 1100 can connect to the communication terminal 200 via the network using Wi-Fi Direct communication as a communication method. On the other hand, the control device 1200 can connect to the communication terminal 200 via a network using LAN communication or Wi-Fi Direct communication as a communication method. Since the communication methods of the operation device 1100 and the control device 1200 are different from each other in connection information of the network, the information processing apparatus 100 and the communication terminal 200 are connected via the network using the connection information specific to each communication.

FIG. 9 illustrates selection of a network (communication path) to be used for communication with the communication terminal 200 when the information processing apparatus 100 acquires the address information from the communication terminal 200. When a plurality of networks (communication paths) is available, the information processing apparatus 100 selects any network (communication method) to be used.

FIG. 9 illustrates that the connection information of the network is transmitted from the operation device 1100 or the control device 1200 to the communication terminal 200 to connect via the network (communication path) selected by the information processing apparatus 100. When the information processing apparatus 100 connects to the communication terminal 200 via the network using the communication method of the operation device 1100, the information processing apparatus 100 transmits a plurality of pieces of connection information from the operation device 1100 to the communication terminal 200 based on the address information. On the other hand, when connecting to the communication terminal 200 via the network using the communication method by the control device 1200, the information processing apparatus 100 transmits the plurality of pieces of connection information from the control device 1200 to the communication terminal 200 based on the address information.

Accordingly, in the second embodiment, the information processing apparatus 100 includes the operation device 1100 connectable to the communication terminal 200 via a network, separately from the control device 1200 that achieves a role as a main unit, and selects any one of the communication methods of the operation device 1100 and the control device 1200 to be used for connection with the communication terminal 200 via the network. Thus, even when there is a plurality of communication paths (communication methods) connectable via a network, the communication resources of the information processing apparatus can be effectively utilized.

Functional Configuration

Figure 10:
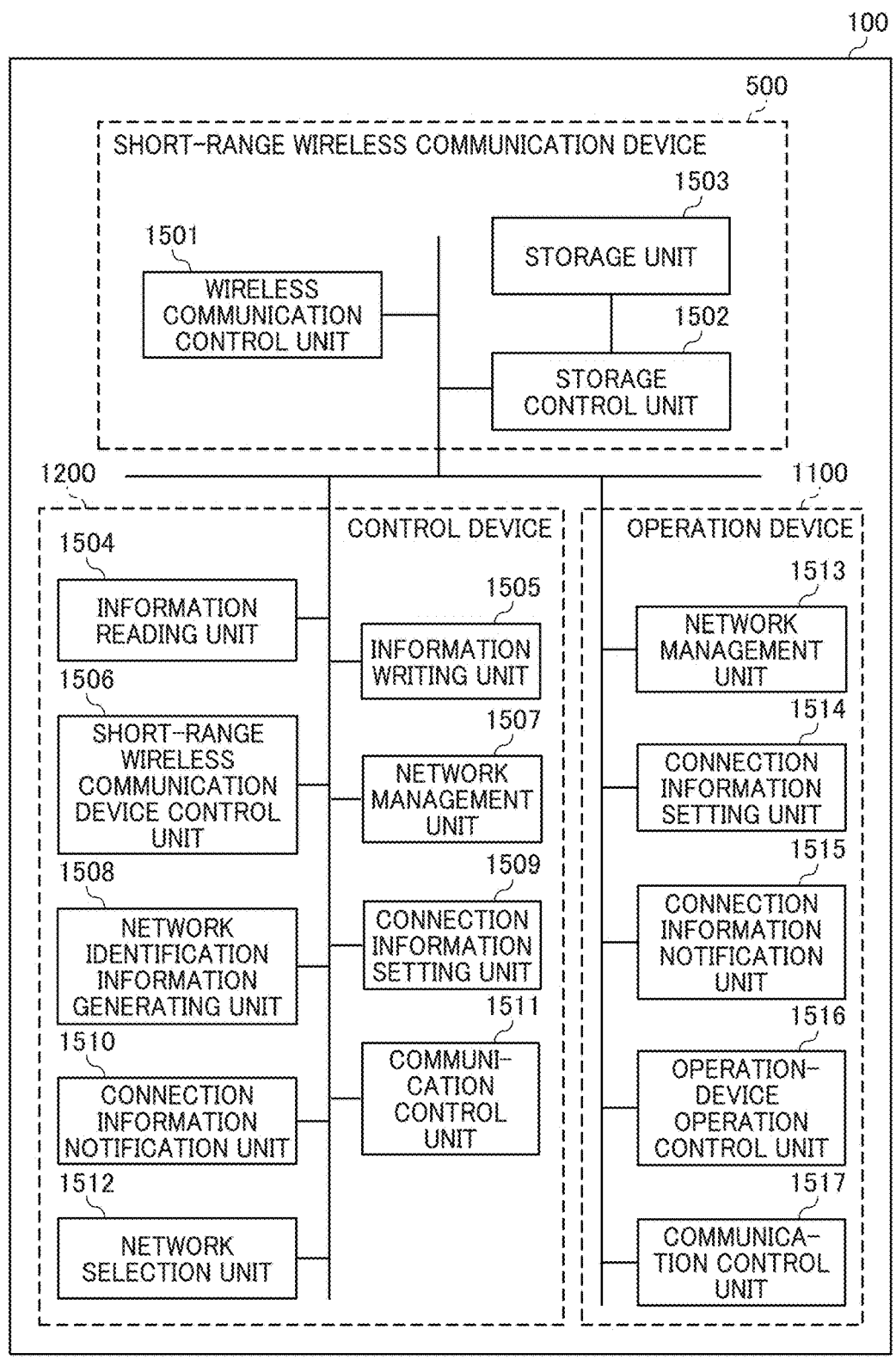
FIG. 10 is a diagram of an example of a functional configuration of an information processing apparatus according to the second embodiment.

FIG. 10 is a diagram of an example of the functional configuration of the information processing apparatus according to the second embodiment. The same reference numerals are given to the same functions as those in the first embodiment, and redundant descriptions thereof are omitted below. In addition to the functions of the first embodiment, the information processing apparatus 100 illustrated in FIG. 10 includes a network selection unit 1512 implemented by the control device 1200 and a network management unit 1513, a connection information setting unit 1514, a connection information notification unit 1515, an operation-device operation control unit 1516, and a communication control unit 1517 implemented by the operation device 1100.

When there is a plurality of communication paths (communication methods) connectable to the information processing apparatus 100 via the network, the network selection unit 1512 selects a communication path (communication method) to connect to the communication terminal 200 via the network. For example, when the operation device 1100 is capable of communicating using the Wi-Fi Direct communication method and the control device 1200 is capable of communicating by LAN or Wi-Fi Direct communication method, the network selection unit 1512 selects which communication method to be used for connection to the communication terminal 200 via the network. The network selection unit 1512 is implemented by, for example, a program executed by the CPU 1201 of the information processing apparatus 100 illustrated in FIG. 3. The network selection unit 1512 is an example of a selection unit.

The network management unit 1513 is a function of managing the network used for the connection between the operation device 1100 of the information processing apparatus 100 and the communication terminal 200 using specific connection information. When the managed network is changed, the network management unit 1513 outputs a network change notification. Specifically, the network management unit 1513 pre-stores the network identification information, which will be described later, and periodically reads the stored network identification information. If the stored network identification information differs from newly-acquired network identification information, the network management unit 1507 determines that the network has been changed, and outputs the network change notification. Change of the network is, for example, change of the default gateway. The network management unit 1513 is implemented by, for example, a program executed by the CPU 1101 of the operation device 1100 illustrated in FIG. 3.

The connection information setting unit 1514 is a function of setting the connection information of the network used by the operation device 1100 of the information processing apparatus 100 for connection with the communication terminal 200. The connection information includes, e.g., address information of the operation device 1100 on the network and is, for example, an IP address of the operation device 1100. The connection information setting unit 1514 is implemented by, for example, a program executed by the CPU 1101 of the operation device 1100 illustrated in FIG. 3.

The connection information notification unit 1515 notifies the communication terminal 200 of the connection information set by the connection information setting unit 1514, based on the address information acquired by the information reading unit 1504. The contents of the processing in the connection information notification unit 1515 are the same as those of the connection information notification unit 1510. The connection information notification unit 1515 is implemented by, for example, a program executed by the CPU 1101 of the operation device 1100 illustrated in FIG. 3. The connection information notification unit 1515 is an example of a notification unit.

The operation-device operation control unit 1516 is a function of controlling the operation of the operation device 1100 included in the information processing apparatus 100. The operation-device operation control unit 1516 is implemented by, for example, a program executed by the CPU 1101 of the operation device 1100 illustrated in FIG. 3.

The communication control unit 1517 is a function of controlling communication via the network between the operation device 1100 included in the information processing apparatus 100 and the communication terminal 200. The communication control unit 1517 controls communication with the communication terminal 200 via the network based on the connection information of the network generated by the network identification information generating unit 1508 and the connection information set by the connection information setting unit 1514. Below, an example is described in which the communication control unit 1517 controls the communication based on the Wi-Fi Direct communication method with the communication terminal 200. Note that the communication method of controlling the communication by the communication control unit 1517 is not limited to the Wi-Fi Direct communication method. The communication control unit 1517 is implemented by, for example, a program executed by the communication device 1107, the CPU 1101, and the like of the operation device 1100 illustrated in FIG. 3.

The information processing apparatus 100 connects to the communication terminal 200 via the network, using either the communication control unit 1517 of the operation device 1100 or the communication control unit 1511 of the control device 1200. The information processing apparatus 100 connects to the communication terminal 200, using a communication path (communication method) for connecting via the network selected by the network selection unit 1512.

Figure 11A:
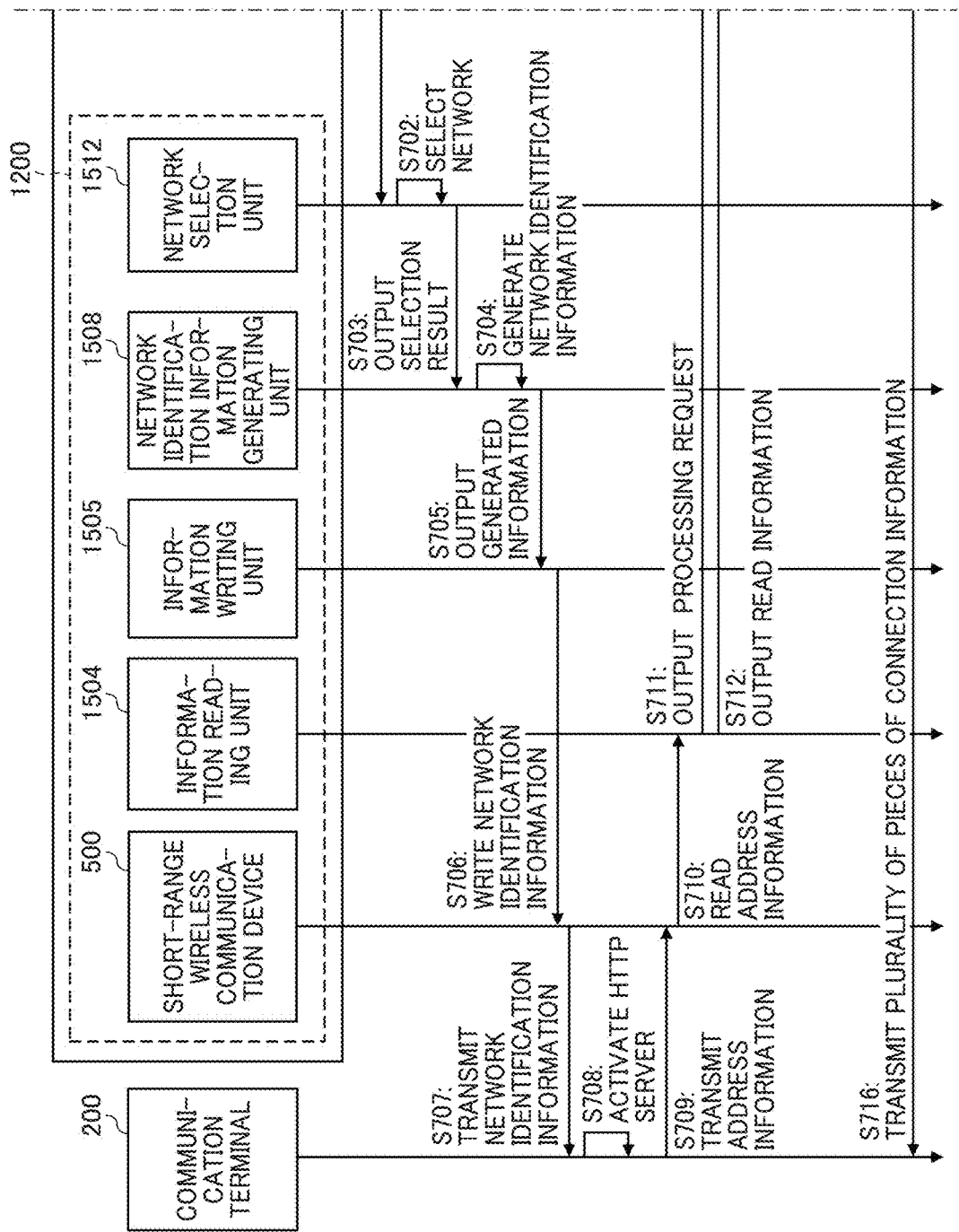
FIG. 11 consisting of FIGS. 11A and 11B is a sequence diagram of an example of connection processing in the communication system according to the second embodiment.

Connection processing FIG. 11 is a sequence diagram of an example of connection processing in the communication system according to the second embodiment. FIG. 11 illustrates a case in which the network used for the connection between the operation device 1100 included in the information processing apparatus 100 and the communication terminal 200 is changed. Below, a description is given of a case in which the communication control unit 1517 of the operation device 1100 is used to connect to the communication terminal 200 via the network.

In step S701, when the network used for connection with the communication terminal 200 by the communication control unit 1517 of the operation device 1100 has been changed, the network management unit 1513 of the operation device 1100 included in the information processing apparatus 100 outputs a network change notification. Specifically, the network management unit 1507 determines that the network has been changed when, e.g., a change in the default gateway is detected, and outputs the network change notification.

In step S702, upon detecting the network change notification, the network selection unit 1512 of the information processing apparatus 100 selects, among a plurality of communication paths (communication methods) connectable via the network in the information processing apparatus 100, a communication path (communication method) for connection to the communication terminal 200 via the network. In step S703, the network selection unit 1512 of the information processing apparatus 100 outputs the selection result to the network identification information generating unit 1508.

Figure 12:
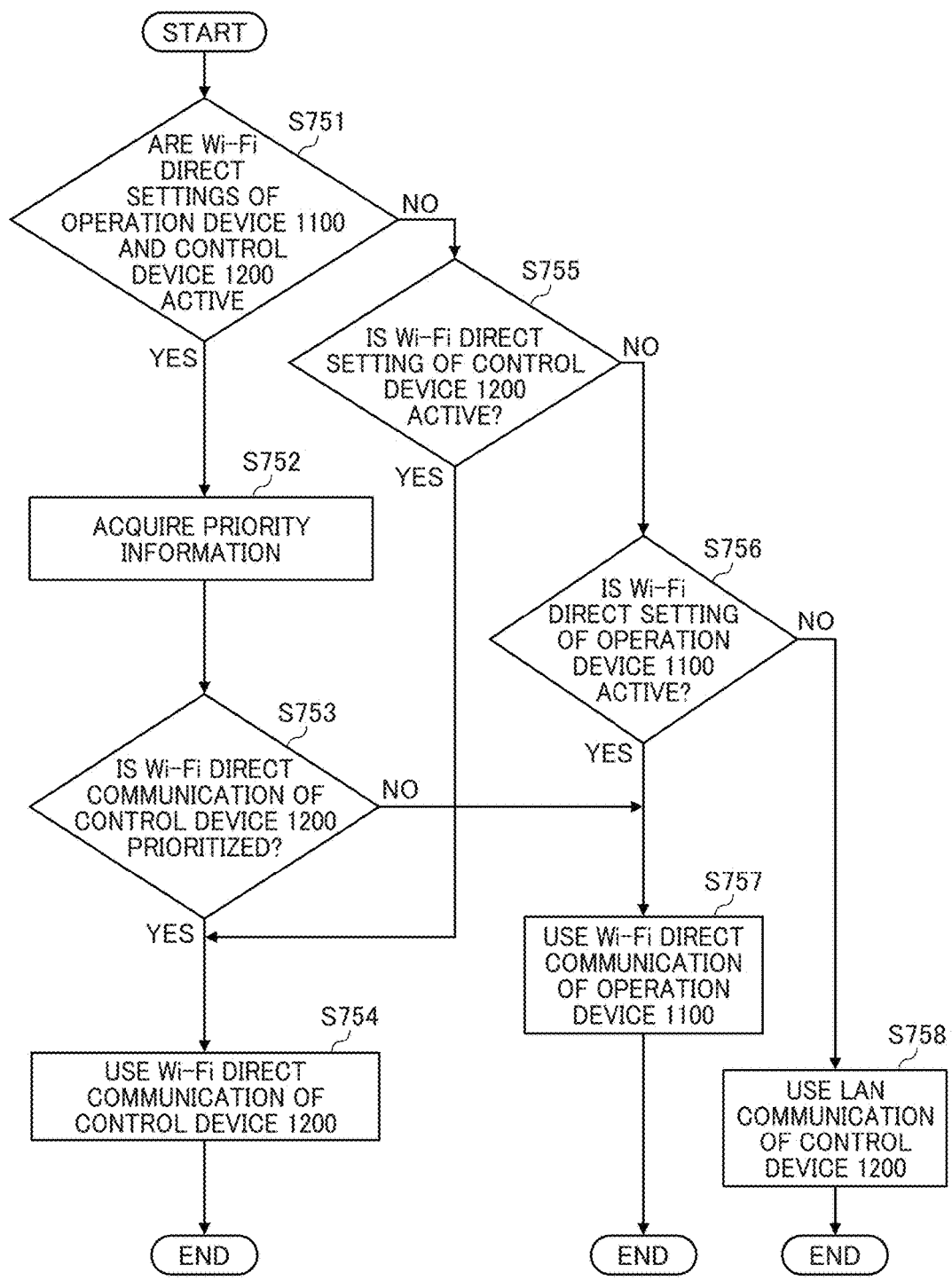
FIG. 12 is a flowchart of an example of selection processing according to the second embodiment.

Here, the contents of processing of the network selection unit 1512 is described. FIG. 12 is a flowchart of an example of selection processing according to the second embodiment. FIG. 12 illustrates an example in which Wi-Fi Direct can be used as a communication method by the operation device 1100 and LAN communication and Wi-Fi Direct can be used as a communication method by the control device 1200. Note that the communication methods used by the operation device 1100 and the control device 1200 are not limited to the example of FIG. 12.

In step S751, the network selection unit 1512 checks whether Wi-Fi Direct settings of the operation device 1100 and the control device 1200 are active. When the Wi-Fi Direct settings of the operation device 1100 and the control device 1200 are active, the process proceeds to step S752; otherwise, the process proceeds to step S755.

In step S752, when the Wi-Fi Direct settings of both the operation device 1100 and the control device 1200 are active, the network selection unit 1512 acquires (reads) priority information. The priority information indicates the priority of a communication path (communication method) used for the information processing apparatus 100 to connect to the communication terminal 200 via the network. For example, when the priority of the communication path (communication method) usable by the control device 1200 is high, the priority order of the communication path (communication method) usable by the control device 1200 is set to be higher than other communication paths (communication methods). The priority order included in the priority information can be set or changed as appropriate by the user. The priority information is stored in advance in, for example, the ROM 1202 or the auxiliary memory 1204 of the information processing apparatus 100.

In step S753, when the priority of the control device 1200 is high, the process proceeds to step S754. In step S754, the network selection unit 1512 selects to use the Wi-Fi Direct communication by the control device 1200 as a communication method. When the priority of the operation device 1100 is high, the process proceeds to the processing of step S757. In step S757, the network selection unit 1512 selects to use the Wi-Fi Direct communication by the operation device 1100 as a communication method.

If the Wi-Fi Direct setting of at least one of the operation device 1100 and the control device 1200 is not active at step S751, the following processing is performed.

In step S755, if the Wi-Fi Direct setting of the control device 1200 is active, the process proceeds to step S754. In step S754, the network selection unit 1512 selects to use the Wi-Fi Direct communication by the control device 1200 as a communication method. If the Wi-Fi Direct setting of the control device 1200 is not active, the process proceeds to step S756.

In step S756, if the Wi-Fi Direct setting of the operation device 1100 is active, the process proceeds to S757. In step S757, the network selection unit 1512 selects to use the Wi-Fi Direct communication by the operation device 1100 as a communication method. If the Wi-Fi Direct setting of the operation device 1100 is not active, the process proceeds to step S758.

In step S758, since neither the Wi-Fi Direct setting of the operation device 1100 nor the control device 1200 is active, the network selection unit 1512 selects to use the LAN communication by the control device 1200 as a communication method. Accordingly, even in the case in which there is a plurality of available communication methods and the information processing apparatus 100 can be connected to the communication terminal 200 via a network using a plurality of communication paths (communication methods), the information processing apparatus 100 can select which communication path (communication System) to be used for the connection via the network.

Returning to FIG. 11, the network setting processing of the second embodiment is further described. In the following description, the processing in the case in which the network selection unit 1512 selects to use the Wi-Fi Direct communication by the operation device 1100 is described. When the network selection unit 1512 selects to use LAN communication or Wi-Fi Direct communication by the control device 1200, processing from step S602 onward in FIG. 8 is performed.

In step S704, when the network identification information generating unit 1508 of the information processing apparatus 100 detects an output result of selection, the network identification information generating unit 1508 generates network identification information of a network used for connection with the communication terminal 200. Specifically, the network identification information generating unit 1508 sets an SSID, an encryption method, a password, and the like which are identification information of the network.

In step S705, the network identification information generating unit 1508 of the information processing apparatus 100 outputs the generated network identification information to the information writing unit 1505. In step S706, the information writing unit 1505 of the information processing apparatus 100 writes the network identification information to the short-range wireless communication device 500. Specifically, the information writing unit 1505 outputs the network identification information to the storage control unit 1502 of the short-range wireless communication device 500. The storage control unit 1502 stores the output network identification information in the storage unit 1503.

In step S707, the wireless communication control unit 1501 of the information processing apparatus 100 transmits the network identification information written in the storage unit 1503 via the short-range wireless communication to the communication terminal 200. Specifically, when the short-range wireless communication device 500 of the information processing apparatus 100 detects the communication terminal 200 that has approached the range within which short-range wireless communication is available, the short-range wireless communication device 500 establishes short-range wireless communication with the communication terminal 200. The wireless communication control unit 1501 transmits the network identification information to the communication terminal 200 via the established short-range wireless communication.

In step S708, when the network identification information is acquired from the information processing apparatus 100 by the network identification information acquisition unit 2502, the communication terminal 200 activates the HTTP server based on the acquired network identification information. The processing in step S708 is the same as the processing in step S606 in FIG. 8.

In step S709, the communication terminal 200 transmits, to the information processing apparatus 100, address information indicating an accessible address on the Internet based on the network identification information via short-range wireless communication. Specifically, the address information notification unit 2503 of the communication terminal 200 notifies the information processing apparatus 100 of the address information of the activated HTTP server, that is, the address information, such as the URL on the Web, via short-range wireless communication. The address information is a URL or the like, and is written on the data format of the short-range wireless communication.

In step S710, the information reading unit 1504 of the information processing apparatus 100 reads the address information received by the short-range wireless communication device 500. Specifically, the information reading unit 1504 acquires the address information received by the wireless communication control unit 1501 and written in the storage unit 1503 by the storage control unit 1502.

In step S711, when the information reading unit 1504 of the information processing apparatus 100 acquires the address information, the information reading unit 1504 of the information processing apparatus 100 outputs a processing request to the operation-device operation control unit 1516 of the operation device 1100 to use the communication method by the operation device 1100 included in the information processing apparatus 100. In step S712, the information reading unit 1504 of the information processing apparatus 100 outputs the acquired address information to the connection information setting unit 1514 of the operation device 1100 included in the information processing apparatus 100. Note that the order of the processing in steps S711 and S712 may be inversed.

In step S713, upon detecting the output address information, the connection information setting unit 1514 of the operation device 1100 included in the information processing apparatus 100 sets the connection information of the network used for connection between the operation device 1100 and the communication terminal 200. The connection information of the network includes address information on the network of the operation device 1100 included in the information processing apparatus 100, and is, for example, an IP address of the operation device 1100. In step S714, the connection information setting unit 1514 of the operation device 1100 outputs the set connection information to the connection information notification unit 1515.

In step S715, upon detecting the output connection information, the connection information notification unit 1515 of the operation device 1100 included in the information processing apparatus 100 activates the HTTP client to transmit the HTTP request. The processing of step S715 is the same as the processing of S612 in FIG. 8.

In step S716, the connection information notification unit 1515 of the operation device 1100 included in the information processing apparatus 100 notifies the communication terminal 200 of a plurality of pieces of connection information, based on the address information acquired from the communication terminal 200 by the activated HTTP client. Specifically, the connection information notification unit 1515 accesses an URL indicated by the address information acquired by the information reading unit 1504, and writes the plurality of pieces of connection information at a location indicated by the URL for access by the communication terminal 200. Accordingly, the plurality of pieces of connection information is obtained by the communication terminal 200.

Accordingly, the communication terminal 200 can use the communication method by the operation device 1100 of the information processing apparatus 100 based on the network identification information and the connection information of the network acquired from the information processing apparatus 100, thus allowing the operation device 1100 of the information processing apparatus 100 to connect to the communication terminal 200 via the network.

Figure 13:
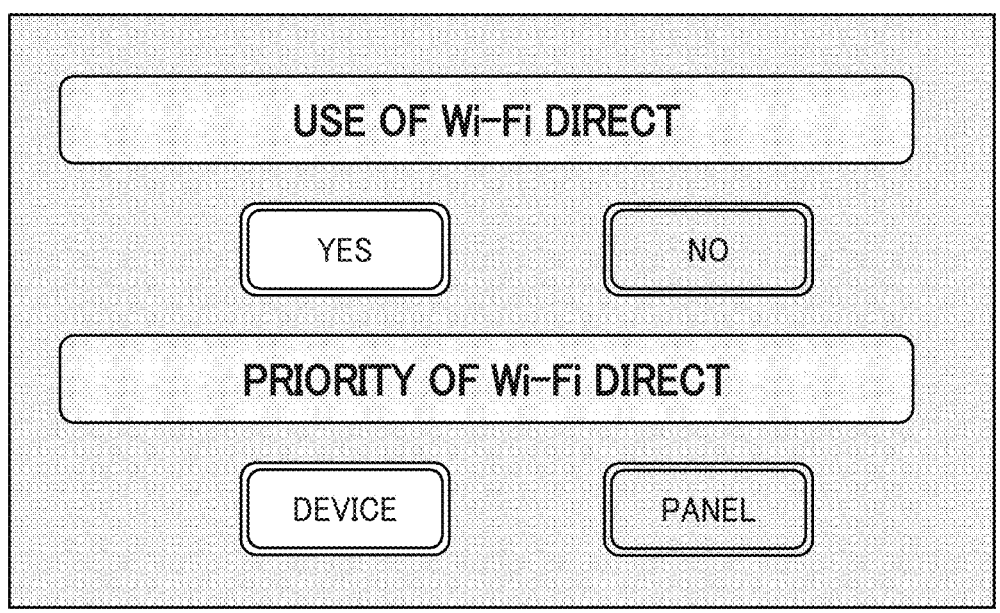
FIG. 13 is a diagram of an example of a priority setting screen according to the second embodiment.

In FIG. 11, the case is described in which the priority information is stored in advance. In some embodiments, the priority information may be input and set to the operation device 1100 by a user. FIG. 13 is a diagram of an example of a priority setting screen according to the second embodiment. FIG. 13 illustrates that it is selectable whether Wi-Fi Direct communication is used as a communication method or which Wi-Fi Direct setting of the operation device 1100 and the control device 1200 is prioritized. The term "device" illustrated in FIG. 13 means the control device 1200, and the term "panel" means the operation device 1100. The priority setting screen illustrated in FIG. 13 is displayed on the display 1106 of the operation device 1100 and can be set by the user's touch panel operation and input operation to the input device 1104. In the example of FIG. 13, it is illustrated that the Wi-Fi Direct communication is used as the communication according to the communication method and the Wi-Fi Direct setting of the control device 1200 is preferentially used.

As described above, according to the second embodiment, the information processing apparatus 100 includes an operation device 1100 that can be connected to the communication terminal 200 via a network, separately from the control device 1200 that achieves a role as a main unit. Then, it is selectable which communication method of the operation device 1100 and the control device 1200 is used to select the connection with the communication terminal 200 via the network. Thus, even when there is a plurality of communication paths connectable via a network, the communication resources of the information processing apparatus can be effectively utilized.

Third Embodiment

Subsequently, a third embodiment is described. The information processing apparatus according to the third embodiment has a power saving control function of controlling the power supply to each part of the information processing apparatus according to the operation state. Note that the same configurations and the same functions as those of the first embodiment or the second embodiment are denoted by the same reference numerals, and redundant descriptions thereof are omitted below.

Figure 14:
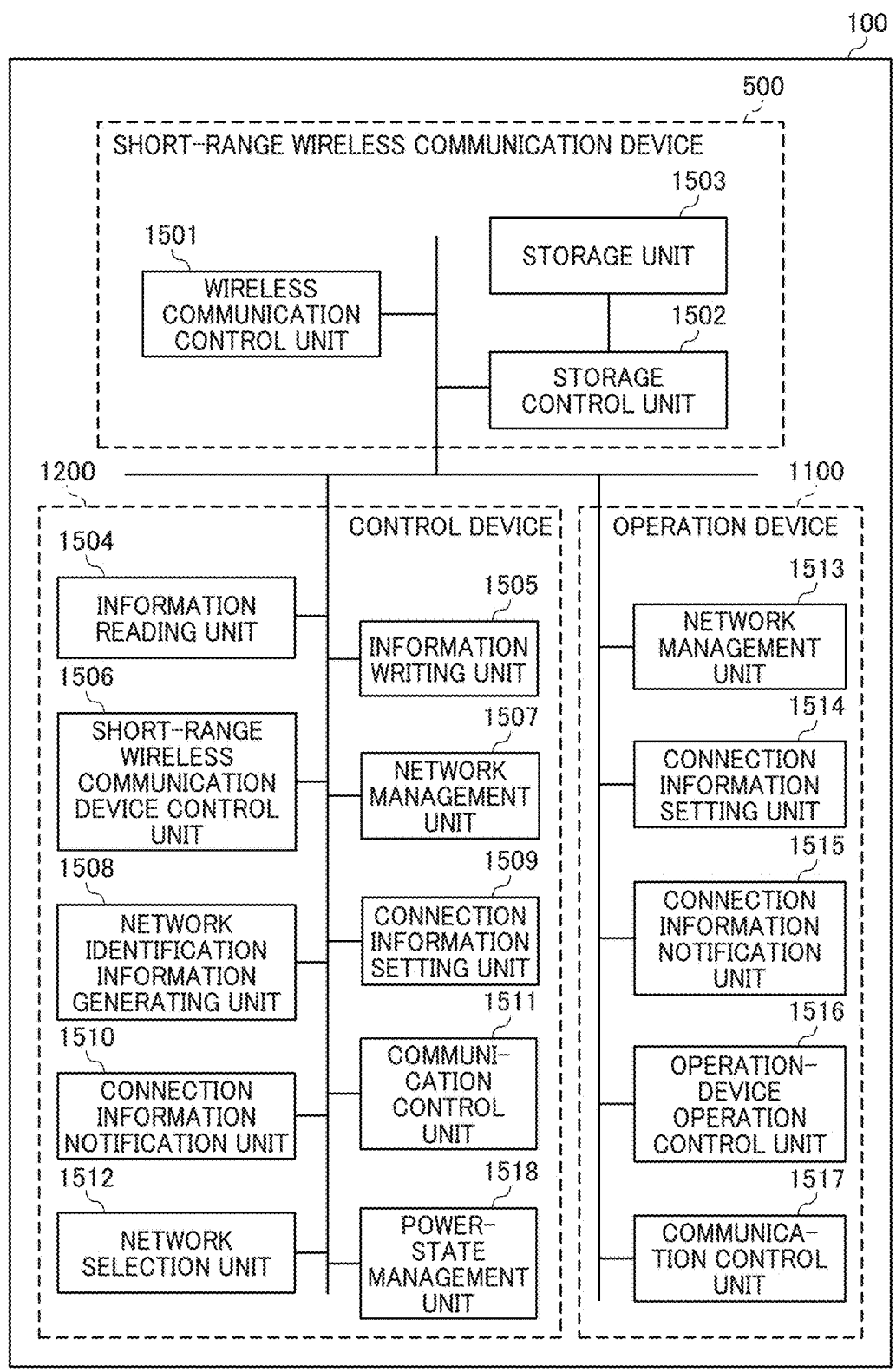
FIG. 14 is a diagram of an example of a functional configuration of an information processing apparatus according to a third embodiment of the present disclosure.

Functional configuration FIG. 14 is a diagram of an example of the functional configuration of the information processing apparatus according to the third embodiment. The information processing apparatus 100 illustrated in FIG. 14 has the function of a power-state management unit 1518 in addition to the functions of the information processing apparatus 100 according to the second embodiment.

The power-state management unit 1518 is a function of managing the power state of the information processing apparatus 100. The power-state management unit 1518 is implemented by, for example, a program executed by the CPU 1201 of the information processing apparatus 100 illustrated in FIG. 3. When there is no key input or job request for a certain period of time, the information processing apparatus 100 performs power saving shift. The power saving shift is to stop the supply of the power of the power supply to each part in a predetermined power saving mode to bring the information processing apparatus 100 into a power saving state. Factors of the power saving shift are cases in which no key input or job request for a certain period of time are not received.

The information processing apparatus 100 returns from the power saving state to a normal operating state when the information processing apparatus 100 detects the occurrence of a power saving return factor in the power saving state. The return from the power saving state is to release the power-supply stop state of the power supply and start the supply. The occurrence of the power saving return factor is, for example, the detection of a radio wave of the short-range wireless communication by the short-range wireless communication device 500. The power-state management unit 1518 manages such shift of the information processing apparatus 100 to the power saving state and return from the power saving state to the normal operating state.

Process-Restart Processing

FIG. 15 (consisting of FIGS. 15A and 15B) is a sequence diagram of an example of process-restart processing in the communication system according to the third embodiment. FIG. 15 illustrates a case in which the information processing apparatus 100 has shifted to the power saving state in advance. In addition, FIG. 15 assumes that the network identification information has been notified from the information processing apparatus 100 to the communication terminal 200 in advance.

In step S801, the short-range wireless communication device 500 receives information transmitted from the communication terminal 200 via short-range wireless communication. In such a case, the wireless communication control unit 1501 of the short-range wireless communication device 500 transmits the address information indicating an address accessible on the Internet based on the network identification information transmitted from the communication terminal 200 via short-range wireless communication.

In step S802, the short-range wireless communication device 500 outputs a detection signal of short-range wireless communication to the short-range wireless communication device control unit 1506 of the information processing apparatus 100. In step S803, the short-range wireless communication device control unit 1506 of the information processing apparatus 100 outputs a return request from the power saving state to the power-state management unit 1518.

In step S804, when detecting the return request, the power-state management unit 1518 of the information processing apparatus 100 outputs a processing restart notification to the information writing unit 1505. Similarly, in step S805, the power-state management unit 1518 outputs a processing restart notification to the information reading unit 1504. The order of the processing in steps S804 and S805 may be inversed.

In step S806, when the information reading unit 1504 of the information processing apparatus 100 detects the processing restart notification, the information reading unit 1504 of the information processing apparatus 100 checks the presence or absence of update of the information with the short-range wireless communication device 500. Specifically, the information reading unit 1504 reads the information stored in the storage unit 1503 of the short-range wireless communication device 500 and checks whether the information has been updated.

When the information has been updated, in step S807, the information reading unit 1504 of the information processing apparatus 100 acquires the updated information. The information reading unit 1504 of the information processing apparatus 100 does not acquire the address information, which is the information received during the period of the power saving state in step S801. Therefore, the information reading unit 1504 acquires the address information as update information. In step S808, the information reading unit 1504 of the information processing apparatus 100 outputs the read update information to the network selection unit 1512.

In step S809, when detecting the output update information, the network selection unit 1512 of the information processing apparatus 100 selects a network to be formed with the communication terminal 200 from among a plurality of networks formable in the information processing apparatus 100. The network selection processing is the same as the processing illustrated in FIG. 12. The following description assumes that the network selection unit 1512 selects to use the Wi-Fi Direct communication by the operation device 1100.

In step S810, the network selection unit 1512 of the information processing apparatus 100 outputs a selection result to the network management unit 1513. In step S811, to use the communication method by the operation device 1100, the network management unit 1513 of the information processing apparatus 100 outputs a processing restart notification to the operation-device operation control unit 1516 of the operation device 1100 included in the information processing apparatus 100.

In step S812, when detecting the processing restart notification, the operation-device operation control unit 1516 of the operation device 1100 included in the information processing apparatus 100 returns the power state of the operation device 1100 from the power saving state and restarts the processing.

The subsequent processing is the same as the processing from step S711 onward in FIG. 11. FIG. 15 illustrates the case of forming a network using the communication method by the operation device 1100 of the information processing apparatus 100. Note that, in the case of forming a network using the communication method by the control device 1200, the processing from step S602 onward in FIG. 8 is performed instead of the processing from step S811 onward. In such a case, in step S810, the network selection unit 1512 outputs the selection result to the network identification information generating unit 1508.

As described above, according to the third embodiment, when the information processing apparatus 100 detects a radio wave of short-range wireless communication in the short-range wireless communication device 500 in the power-saving state, the power state of the information processing apparatus 100 is returned from the power saving state, thus allowing prompt restart of the connection of information processing apparatus and the communication terminal 200 via a network.

Furthermore, when a communication method using the operation device 1100 is used for connection with the communication terminal 200 via a network, in cooperation with the control device 1200 that plays the role of the main unit, the power state of the operation device 1100 is returned from the power saving state, thus prompt restart of the connection with the communication terminal 200 via the network.

Fourth Embodiment

Next, a fourth embodiment is described below. Note that the same configurations and the same functions as those of the first to third embodiments are denoted by the same reference numerals, and redundant descriptions thereof are omitted below.

Functional Configuration

Figure 16:
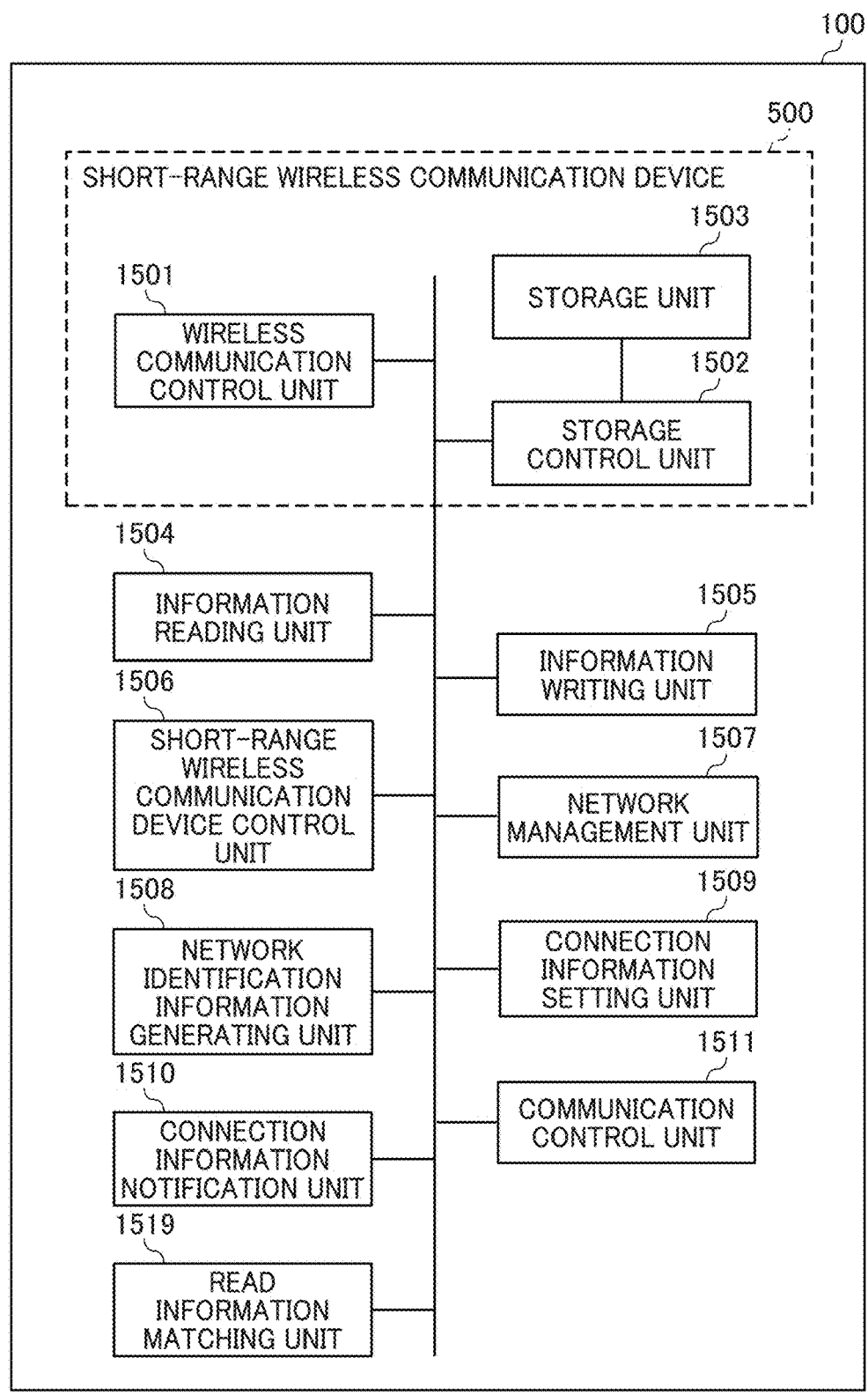
FIG. 16 is a diagram of an example of a functional configuration of an information processing apparatus according to a fourth embodiment of the present disclosure.

FIG. 16 is a diagram of an example of the functional configuration of the information processing apparatus according to the fourth embodiment. The information processing apparatus 100 illustrated in FIG. 16 has the function of a read information matching unit 1519 in addition to the functions of the first embodiment.

The read information matching unit 1519 is a function of matching the information acquired from an external device, such as the communication terminal 200, via short-range wireless communication. The read information matching unit 1519 determines whether the information (transmission information) acquired by the short-range wireless communication device 500 matches pre-stored registration information. The registration information is, for example, address information, such as a URL on the Web, and is regular information that the information processing apparatus 100 acquires from the communication terminal 200 via short-range wireless communication.

When the acquired information (transmission information) does not match the registration information, that is, when the acquired information (transmission information) is incorrect information, the read information matching unit 1519 notifies the information writing unit 1505 of rewriting of information. The read information matching unit 1519 is implemented by, for example, a program executed by the CPU 1201 of the information processing apparatus 100 illustrated in FIG. 3.

Matching Processing of Read Information

FIG. 17 is a sequence diagram of an example of matching processing of read information in the communication system according to the fourth embodiment. The processing of steps S901 to S905 illustrated in FIG. 17 is the same as the processing of steps S601 to S605 illustrated in FIG. 7.

In step S906, when the short-range wireless communication with the short-range wireless communication device 500 is established, the communication terminal 200 transmits information via the short-range wireless communication. In such a case, it is assumed that the information (transmission information) transmitted from the communication terminal 200 is different from the registration information stored in advance in the information processing apparatus 100. The wireless communication control unit 1501 of the short-range wireless communication device 500 receives information (transmission information) transmitted from the communication terminal 200 via short-range wireless communication.

In step S907, the information reading unit 1504 of the information processing apparatus 100 reads the information received by the short-range wireless communication device 500. In step S908, the information reading unit 1504 of the information processing apparatus 100 outputs the read information to the read information matching unit 1519.

In step S909, the read information matching unit 1519 of the information processing apparatus 100 determines whether the output read information matches pre-stored registration information. For example, the read information matching unit 1519 matches the pre-stored registration information with the read information and determines whether the read information matches registration information. The registration information is, for example, address information, such as a URL in the Web, and is regular information that the information processing apparatus 100 acquires from the communication terminal 200 via short-range wireless communication. The read information matching unit 1519 determines that the read information does not match the registration information because the information transmitted from the communication terminal 200 in step S906 does not match the registration information.

In step S910, when the read information is not the registration information, the read information matching unit 1519 of the information processing apparatus 100 outputs a rewriting notification of the read information to the information writing unit 1505. On the other hand, when the read information matching unit 1519 determines that the read information matches the registration information, the read information matching unit 1519 does not perform the processing from step S910 onward. In step S911, when the information writing unit 1505 of the information processing apparatus 100 detects the output rewriting notification, the information writing unit 1505 of the information processing apparatus 100 writes the pre-stored registration information to the short-range wireless communication device 500.

As described above, according to the fourth embodiment, when the information acquired from the communication terminal 200 via the short-range wireless communication is false data, the information processing apparatus 100 can write the pre-stored registration information to the short-range wireless communication device 500 to continue the connection with the communication terminal 200 via the network.

As described above, the information processing apparatus according to at least one embodiment of the present disclosure is an information processing apparatus 100 that connects to the communication terminal 200 via a network using specific connection information. The information processing apparatus 100 transmits network identification information of a network formed with the communication terminal 200 to the communication terminal 200, and acquires from the communication terminal 200 the address information indicating an address on the Internet accessible based on the transmitted network identification information. The information processing apparatus 100 notifies the communication terminal 200 of connection information on a plurality of networks based on the acquired address information. Accordingly, when the information processing apparatus 100 can connect to the communication terminal 200 using different communication paths, the communication resources of the information processing apparatus 100 can be effectively utilized.

Further, the information processing apparatus according to at least one embodiment of the present disclosure transmits the network identification information of the network formed with the communication terminal 200 via short-range wireless communication and notifies the communication terminal 200 of connection information of a plurality of networks based on the address information acquired from the communication terminal 200. Therefore, the security in communication between the information processing apparatus 100 and the communication terminal 200 can be more enhanced than a case in which information for establishing a communication path with the communication terminal 200 is transmitted using only short-range wireless communication.

Furthermore, the information processing apparatus according to at least one embodiment of the present disclosure notifies the connection information of a plurality of networks to the communication terminal 200 as an HTTP request based on a HTTP communication protocol. Therefore, in the case in which the information processing apparatus can connect to the communication terminal using different communication paths, the communication resources of the information processing apparatus cam be effectively utilized without changing the format of the short-range wireless communication.

The information processing apparatus according to at least one of the present disclosure includes the operation device 1100 that can be connected to the communication terminal 200 via a network, separately from the control device 1200 that plays a role as a main unit. The information processing apparatus 100 selects a communication method to be used for connection with the communication terminal 200 via the network, among the communication methods usable by the operation device 1100 and the control device 1200. Accordingly, even when there is a plurality of communication paths connectable to the communication terminal 200 via the network, the communication resources of the information processing apparatus can be effectively utilized.

Furthermore, for the information processing apparatus according to at least one embodiment of the present disclosure, the information processing apparatus 100 returns from the power-saving state when the information processing apparatus 100 is in the power saving state and detects short-range wireless communication with the communication terminal 200. Thus, even when the information processing apparatus 100 is in the power saving state, the communication with the communication terminal 200 can be promptly restarted.

In addition, when the network for connection with the communication terminal 200 is changed, the information processing apparatus according to at least one embodiment of the present disclosure writes the changed network identification information in the storage unit 1503 of the short-range wireless communication device 500. Accordingly, since the information processing apparatus 100 can transmit the changed network identification information at any time via short-range wireless communication, the information processing apparatus 100 can continuously connect to the communication terminal 200 via the network.

Furthermore, the information processing apparatus according to at least one embodiment of the present disclosure matches transmission information transmitted from the communication terminal 200 via short-range wireless communication with the registration information stored in advance. When the transmission information transmitted from the communication terminal 200 is not the registration information, the information processing apparatus writes the registration information in the storage unit 1503 of the short-range wireless communication device 500. Accordingly, even when false information is transmitted from the communication terminal 200, the information processing apparatus writes the pre-stored registration information in the short-range wireless communication device 500, thus allowing continuous communication with the communication terminal 200.

A communication system according to at least one embodiment of the present disclosure is a communication system including the communication terminal 200 and the information processing apparatus 100 that connects to the communication terminal 200 via a network using specific connection information. The communication system transmits network identification information of a network to be formed with the communication terminal 200 via short-range wireless communication, and acquires address information indicating an address accessible on the Internet based on the transmitted network identification information. The information processing apparatus 100 notifies connection information of a plurality of networks based on the acquired address information. Accordingly, when the information processing apparatus can connect to the communication terminal using different communication paths, the communication resources of the information processing apparatus can be effectively utilized.

Furthermore, a communication method according to at least one embodiment of the present disclosure includes: transmitting network identification information of a network formed using specific connection information via short-range wireless communication; acquiring, based on the transmitted network identification information, address information indicating an accessible address on the Internet; and notifying a communication terminal of a plurality of pieces of connection information based on the acquired address information. Accordingly, when the information processing apparatus can connect to the communication terminal using different communication paths, the communication resources of the information processing apparatus can be effectively utilized.

Furthermore, a non-transitory recording medium according to at least one embodiment of the present disclosure stores a computer-readable program causing one or more processors to execute a communication method. The communication method includes: transmitting network identification information of a network formed using specific connection information via short-range wireless communication; acquiring, based on the transmitted network identification information, address information indicating an accessible address on the Internet; and notifying a communication terminal of a plurality of pieces of connection information based on the acquired address information.

Accordingly, when the information processing apparatus can connect to the communication terminal using different communication paths, the communication resources of the information processing apparatus can be effectively utilized.

The function of each embodiment can be implemented by a computer-readable program, described by object-oriented programming languages such as C++, C#, Java (registered trademark), or legacy programming languages such as machine language, assembler language, C language. The computer-readable program can be stored and provided in a recording medium, such as a ROM, an electrically erasable and programmable read only memory (EEPROM), an erasable programmable read only memory (EPROM), a flash memory, flexible disc, a compact disc read only memory (CD-ROM), a compact disc-recording only/rewritable (CD-R/RW), a digital versatile disk read only memory (DVD-ROM), a DVD-random access memory (RAM), a DVD-recording only/rewritable (DVD-R/RW), a Blu-ray disc, a memory card or stick such as an SD card or a USB memory, a memory chip, a mini disk (MD), a magneto optical disc (MO), a magnetic tape, a hard disk in a server, a solid state memory device or the like, but not limited the above-described examples. Alternatively, the computer-readable program can be distributed through a telecommunications line. In addition, some or all of the functions of each embodiment may be implemented on a programmable device (PD), such as a field programmable gate array (FPGA) or implemented as an application specific integrated circuit (ASIC). Alternatively, some or all of the functions of each embodiment may be distributed by a recording medium as, for example, circuit configuration data (bit stream data) downloaded to the PD to perform the functions of each embodiment on the PD or data described by hardware description language (HDL), very high speed integrated circuits hardware description language (VHDL), or verilog-HDL for generating the circuit configuration data.

Although the information processing apparatus, the communication system, the communication method, and the recording medium storing the program according to embodiments of the present disclosure have been described above, numerous additional modifications and variations are possible in light of the above teachings. It is therefore to be understood that, within the scope of the appended claims, the disclosure of this patent specification may be practiced otherwise than as specifically described herein. As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art. Each of the functions of the described embodiments may be implemented by one or more processing circuits. A processing circuit includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An information processing apparatus comprising:
circuitry configured to,
transmit network identification information of a network to a communication terminal via short-range wireless communication,
acquire, from the communication terminal via short-range wireless communication, address information indicating an address on the Internet accessible by the communication terminal based on the network identification information, and
notify the communication terminal of a plurality of pieces of connection information by generating, using the address information acquired from the communication terminal, a hypertext transfer protocol (HTTP) request based on an HTTP communication protocol, the connection information being used to establish a connection between the information processing apparatus and the communication terminal through the network.

2. An information processing apparatus comprising:
circuitry configured to,
transmit network identification information of a network to a communication terminal via short-range wireless communication,
acquire, from the communication terminal via short-range wireless communication, address information indicating an address on the Internet accessible by the communication terminal based on the network identification information, and
notify the communication terminal of a plurality of pieces of connection information using the address information acquired from the communication terminal, the connection information being used to establish a connection between the information processing apparatus and the communication terminal through the network,
wherein the circuitry selects a communication method to be used for the connection with the communication terminal via the network, and
wherein the circuitry establishes the connection with the communication terminal via the network according to the communication method selected.

3. The information processing apparatus according to claim 2, further comprising:
a control device connectable to the communication terminal via the network, the control device including the circuitry; and
an operation device connectable to the communication terminal via the network,
wherein the circuitry is configured to select the communication method used for connection with the communication terminal via the network, from among a plurality of communication methods usable in the control device and the operation device.

4. The information processing according to claim 2,
wherein the circuitry is configured to select the communication method used for connection with the communication terminal via the network, based on priority information indicating a priority of the communication method.

5. The information processing apparatus according to claim 2,
wherein the communication method includes LAN communication and Wi-Fi Direct communication.

6. An information processing apparatus comprising:
circuitry configured to, transmit network identification information of a network to a communication terminal via short-range wireless communication, acquire, from the communication terminal via short-range wireless communication, address information indicating an address on the Internet accessible by the communication terminal based on the network identification information, and notify the communication terminal of a plurality of pieces of connection information using the address information acquired from the communication terminal, the connection information being used to establish a connection between the information processing apparatus and the communication terminal through the network, wherein the circuitry is configured to control a power state of the information processing apparatus, and wherein, in a power saving state, in response to detection of a radio wave of the short-range wireless communication with the communication terminal, the circuitry is configured to change the power state from the power saving state to a normal operating state.

7. An information processing apparatus comprising:
a memory configured to store information for communication with a communication terminal via a short-range wireless communication; and
circuitry configured to,
  transmit network identification information of a network to the communication terminal via the short-range wireless communication,
  acquire, from the communication terminal via short-range wireless communication, address information indicating an address on the Internet accessible by the communication terminal based on the network identification information, and
  notify the communication terminal of a plurality of pieces of connection information using the address information acquired from the communication terminal, the connection information being used to establish a connection between the information processing apparatus and the communication terminal through the network,
  wherein, when the connection information is changed, the circuitry is configured to overwrite connection information stored in the memory with the changed connection information.

8. The information processing apparatus according to claim 7,
  wherein the circuitry is configured to determine whether transmission information transmitted from the communication terminal via the short-range wireless communication matches pre-stored registration information,
  wherein, when the circuitry determines that the transmission information does not match the registration information, the circuitry is configured to write the registration information in the memory.

9. A communication system comprising:
a communication terminal;
an information processing apparatus configured to connect to the communication terminal via a network using at least one of a plurality of pieces of connection information; and
circuitry configured to,
  transmit network identification information of the network to the communication terminal via short-range wireless communication,
  acquire, from the communication terminal, address information indicating an address on the Internet accessible based on the network identification information, and
  notify the communication terminal of the plurality of pieces of connection information by generating, based on the address information acquired from the communication terminal, a hypertext transfer protocol (HTTP) request based on an HTTP communication protocol, the connection information being used to establish a connection between the information processing apparatus and the communication terminal through the network.

10. A communication method comprising:
transmitting network identification information of a network to a communication terminal via short-range wireless communication;
acquiring, from the communication terminal, address information indicating an address on the Internet accessible based on the network identification information; and
notifying the communication terminal of a plurality of pieces of connection information by generating, based on the address information acquired from the communication terminal, a hypertext transfer protocol (HTTP) request based on an HTTP communication protocol, the connection information being used to establish a connection with the communication terminal through the network.

11. A non-transitory computer readable medium storing code that, when executed by circuitry, configures the circuitry to,
  transmit network identification information of a network to a communication terminal via short-range wireless communication,
  acquire, from the communication terminal via short-range wireless communication, address information indicating an address on the Internet accessible by the communication terminal based on the network identification information, and
  notify the communication terminal of a plurality of pieces of connection information by generating, based on the address information acquired from the communication terminal, a hypertext transfer protocol (HTTP) request based on an HTTP communication protocol, the connection information being used to establish a connection with the communication terminal through the network.

* * * * *